US011708511B2

(12) United States Patent
Laferte et al.

(10) Patent No.: US 11,708,511 B2
(45) Date of Patent: Jul. 25, 2023

(54) ADHESIVE MULTICOMPONENT COMPOSITION AND USES THEREOF

(71) Applicant: BOSTIK SA, Colombes (FR)

(72) Inventors: Olivier Laferte, Venette (FR); Claire Garnier, Venette (FR); Régis Guillotte, Venette (FR); Jean-Marie Bordat, Venette (FR)

(73) Assignee: BOSTIK SA, Colombes (FR)

( * ) Notice: Subject to any disclaimer, the term of this patent is extended or adjusted under 35 U.S.C. 154(b) by 402 days.

(21) Appl. No.: 16/768,140

(22) PCT Filed: Dec. 13, 2018

(86) PCT No.: PCT/FR2018/053261
§ 371 (c)(1),
(2) Date: May 29, 2020

(87) PCT Pub. No.: WO2019/115952
PCT Pub. Date: Jun. 20, 2019

(65) Prior Publication Data
US 2020/0317962 A1 Oct. 8, 2020

(30) Foreign Application Priority Data

Dec. 14, 2017 (FR) ...................................... 1762126

(51) Int. Cl.
| | |
|---|---|
| *C08G 18/10* | (2006.01) |
| *C09J 7/38* | (2018.01) |
| *C09J 7/35* | (2018.01) |
| *C08G 18/28* | (2006.01) |
| *C08G 18/48* | (2006.01) |
| *C08G 18/75* | (2006.01) |
| *C08G 18/76* | (2006.01) |
| *C08G 18/83* | (2006.01) |
| *C08K 5/05* | (2006.01) |
| *C08K 5/09* | (2006.01) |
| *C08K 5/17* | (2006.01) |
| *C09J 167/00* | (2006.01) |
| *C09J 175/04* | (2006.01) |

(52) U.S. Cl.
CPC ............... *C09J 7/38* (2018.01); *C08G 18/10* (2013.01); *C08G 18/289* (2013.01); *C08G 18/48* (2013.01); *C08G 18/755* (2013.01); *C08G 18/758* (2013.01); *C08G 18/7621* (2013.01); *C08G 18/7642* (2013.01); *C08G 18/7671* (2013.01); *C08G 18/837* (2013.01); *C08K 5/05* (2013.01); *C08K 5/09* (2013.01); *C08K 5/17* (2013.01); *C09J 7/35* (2018.01); *C08G 2170/20* (2013.01); *C09J 167/00* (2013.01); *C09J 175/04* (2013.01); *C09J 2471/00* (2013.01)

(58) Field of Classification Search
USPC ............... 428/411.1, 412, 355 N; 528/44, 60
See application file for complete search history.

(56) References Cited

U.S. PATENT DOCUMENTS

| | | |
|---|---|---|
| 2011/0052912 A1 | 3/2011 | Poivet et al. |
| 2011/0151253 A1 | 6/2011 | Laferte et al. |
| 2015/0030848 A1* | 1/2015 | Goubard ................. A61L 15/58 428/355 R |
| 2015/0118489 A1* | 4/2015 | Laferte .................. C08G 18/12 428/355 N |
| 2015/0118490 A1 | 4/2015 | Laferte et al. |
| 2015/0152292 A1 | 6/2015 | Chartrel |
| 2015/0175849 A1 | 6/2015 | Chartrel et al. |
| 2015/0184043 A1* | 7/2015 | Goubard ................ C08G 18/10 525/458 |
| 2015/0184045 A1* | 7/2015 | Goubard ............... C08G 18/289 525/458 |
| 2019/0249038 A1* | 8/2019 | Goubard ............ C08G 18/4825 |
| 2019/0256745 A1* | 8/2019 | Goubard .................. C09J 7/255 |
| 2021/0032519 A1* | 2/2021 | Laferte ................. C08L 101/10 |
| 2022/0049143 A1* | 2/2022 | Garnier ............. C08G 18/4825 |

FOREIGN PATENT DOCUMENTS

| | | |
|---|---|---|
| EP | 1829928 A1 | 9/2007 |
| EP | 2336208 A1 | 6/2011 |
| EP | 2865694 A1 | 4/2015 |
| EP | 2865728 A1 | 4/2015 |
| EP | 2878364 A1 | 6/2015 |

(Continued)

OTHER PUBLICATIONS

WO 2013174891 A2; Kramer Andreas; Polymer Containing Silane Groups; Date Published Nov. 28, 2013 (Year: 2013).*

(Continued)

*Primary Examiner* — Terressa Boykin
(74) *Attorney, Agent, or Firm* — NK Patent Law

(57) ABSTRACT

A multicomponent adhesive composition comprises a composition A and a composition B. Composition A comprises at least one silyl polymer comprising at least one hydrolyzable alkoxysilane group and at least one tackifying resin. Composition B comprises at least one catalyst and at least one compound C chosen from a compound C1 with a number-average molecular mass ranging from 300 g/mol to 500 000 g/mol; and a compound C2 with a vapor pressure at 20° C. of greater than or equal to 0.08 kPa; and mixtures thereof. The composition A:composition B mass ratio ranges from 99.98:0.02 to 60:40. The total content of catalyst ranges from 0.01% to 10% relative to the total weight of said adhesive composition.

20 Claims, 2 Drawing Sheets

(56) References Cited

FOREIGN PATENT DOCUMENTS

| EP | 2886201 A1 | 6/2015 |
|---|---|---|
| EP | 2889349 A1 | 7/2015 |
| JP | 2015131957 A | 7/2015 |
| WO | 2008133265 A1 | 11/2008 |
| WO | 2009106699 A2 | 9/2009 |
| WO | 2013136108 A1 | 9/2013 |
| WO | WO2013174891 A2 * | 11/2013 |
| WO | 2018078271 A1 | 5/2018 |

OTHER PUBLICATIONS

ISA/EP; International Search Report for International Patent Application No. PCT/FR2018/053261 dated Mar. 29, 2020, 13 pages.

* cited by examiner

ADHESIVE MULTICOMPONENT COMPOSITION AND USES THEREOF

CROSS-REFERENCE TO RELATED APPLICATIONS

This application is a U.S. National Stage application of International Patent Application No. PCT/FR2018/053261, filed on Dec. 13, 2018, which claims the benefit of French Patent Application No. 1762126, filed on Dec. 14, 2017.

FIELD OF THE INVENTION

The present invention relates to a multicomponent adhesive composition, and to the use of said adhesive composition for the preparation of a self-adhesive article.

The present invention also relates to a process for the hot application of said composition.

TECHNICAL BACKGROUND

Hot-melt pressure-sensitive adhesives (HMPSAs) are compositions which confer, on the support which is coated therewith, immediate tack at room temperature, which advantageously allows its instantaneous adhesion to a substrate under the effect of a gentle and brief pressure. HMPSAs are widely used in the manufacture of self-adhesive articles, for instance self-adhesive labels which are attached to articles for purposes of presentation of information (such as barcode, name, price) and/or for decorative purposes, whether during definitive or temporary adhesive bonding operations. HMPSAs are also used for the manufacture of self-adhesive tapes of varied uses. Mention may be made, for example, besides the transparent adhesive tape widely used in daily life, of: the forming and the assembling of cardboard packagings; the protection of surfaces for painting operations, in construction; the fixing and the maintenance of various elements, such as panels, bricks, protruding objects, in the construction of buildings or edifices; the fixing and the maintenance of metal, plastic or glass parts, which are flat or which have specific profiles, such as electric cables, plastic films, window panes, metal sheets, inscriptions, logos, parts of seats, dashboards, plastic or textile walls, conduits or pipes for the circulation of fluids, in particular in the transportation industry; the adhesive bonding of fitted carpets by double-sided adhesive tapes in the building sector.

For the purpose of manufacturing self-adhesive articles (for example self-adhesive labels and/or tapes), HMPSAs are often applied by continuous coating processes over the whole of the surface of a large-sized support layer (if appropriate printable), in an amount (generally expressed in g/m$^2$) denoted below by the term of "weight per unit area". The support layer is made of paper or a film of a polymeric material having one or more layers. The adhesive layer which covers the support layer may itself be covered with a protective nonstick layer (often called a release liner), for example consisting of a silicone film. The multilayer system obtained is generally packaged by winding in the form of large reels up to 2 m in width and 1 m in diameter, which can be stored and transported.

These multilayer systems can subsequently be converted into self-adhesive labels that can be applied by the end user, by means of transformation processes which include the printing of desired informative and/or decorative elements onto the printable surface of the support layer, followed by cutting to the desired shape and sizes. The protective nonstick layer can be readily removed without modifying the adhesive layer, which remains attached to the support layer. After separation from its protective nonstick layer, the label is applied to the article to be coated either manually or with the aid of labeling machines on automated packaging lines.

These multilayer systems may also be converted into self-adhesive tapes by cutting and packaging as rolls of given width and lengths with cutting or pre-cutting of particular shapes that are useful for their final use, for instance for the assembly of parts of variable size and of variable shape, in the electronics industry, whether for industrial applications or for consumer purposes.

HMPSAs advantageously allow, by virtue of their high room-temperature tack, rapid setting or attachment of the self-adhesive article (for example self-adhesive label and/or tape) to the substrate to be coated (for example, as regards labels, on bottles, or, as regards tapes, on packaging boxes to be formed).

In certain applications, it is desired to obtain adhesive bonds which have high mechanical strength, at room temperature or at elevated temperatures. Hot-melt compositions may be cured via various techniques. Emission of ultraviolet (UV) or electron beam (EB) radiation is well known to form covalent bonds which allow polymer chains or molecules to be joined together, and thus to bring about greater strength of the self-adhesive material. Other systems, known as "chemically reactive" systems, are known, which make it possible to create covalent bonds in the adhesive material: via radical reactions or via cationic catalysis, addition, condensation, etc. For example, it is known practice to use silyl polymers in HMPSAs, which, by hydrolysis and condensation of the silane reactive functions, will advantageously allow the formation of bridges of siloxane type between the compounds.

The coating of such "chemically reactive" systems is typically accompanied by a step of curing of the reactive functions, generally performed in an oven. The curing time required to obtain the adhesion properties is a particularly important parameter as regards the industrial production of self-adhesive articles. Specifically, in the case, for example, of curable systems containing silyl polymers, it determines the dimensioning of the oven, and also the corresponding residence time of the coated support layer, which will condition the energy consumption, and thus the production efficiency of the process as a whole.

There is thus a need for novel adhesive compositions which lead to much faster curing times, and thus make it possible to prepare self-adhesive articles on production lines that have higher line rates.

There is also a need for novel adhesive compositions for preparing self-adhesive articles with a high industrial production rate, while at the same time having good adhesion properties after curing.

There is also a need for novel adhesive compositions which lead to self-adhesive articles which do not have optical and/or physical defects.

DESCRIPTION OF THE INVENTION

The present invention relates to a multicomponent adhesive composition, preferably a hot-melt pressure-sensitive adhesive composition, comprising:
   a composition A comprising:
      at least one silyl polymer comprising at least one hydrolyzable alkoxysilane group;
      at least one tackifying resin;

a composition B comprising:
  at least one catalyst;
  at least one compound C chosen from:
    a compound C1 with a number-average molecular mass ranging from 300 g/mol to 500 000 g/mol; and
    a compound C2 with a vapor pressure at 20° C. of greater than or equal to 0.08 kPa;
    and mixtures thereof;
  the composition A:composition B mass ratio ranging from 99.98:0.02 to 60:40, preferably from 99.95:0.05 to 60:40, and preferentially from 99.95:0.05 to 80:20, and even more preferentially from 99.95:0.05 to 90:10;
  the total content of catalyst ranging from 0.01% to 10% by weight and preferably from 0.01% to 5% by weight relative to the total weight of said adhesive composition.

Preferably, the composition according to the invention is a two-component composition.

In the present patent application, the viscosities indicated are measured using a Brookfield CAP2000+ cone-plate viscometer.

Composition A ate main chain, a polyester-polycarbonate main chain, a polyacetal main chain, a polyester-polyamide main chain, a polythioether main chain, a polyurethane main chain, a polyester-polyurethane main chain, a polyether-polyurethane main chain, a polyether-polyester-polyurethane main chain, a polyolefin-polyurethane main chain, a polyether-polyolefin-polyurethane main chain.

Preferably, the silyl polymers including at least one hydrolyzable alkoxysilane group are chosen from silyl polyether-polyurethanes, silyl polyethers, silyl polyesters, silyl polyester-polyurethanes, and mixtures thereof.

The silyl polymer may have a number-average molecular mass ranging from 500 to 50000 g/mol, preferably ranging from 700 to 30000 g/mol, advantageously from 1000 to 25000 g/mol, in particular from 1000 to 21000 g/mol.

The number-average molecular mass of the silyl polymers may be measured by methods that are well known to those skilled in the art, for example by size exclusion chromatography using polystyrene standards.

According to one embodiment, the silyl polymer including at least one hydrolyzable alkoxysilane group is chosen from the polymers of formulae (II), (III), (IV) or (V) as defined below, and mixtures thereof:

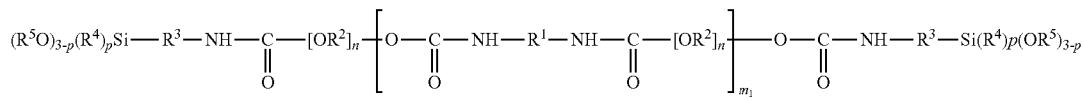
(II)

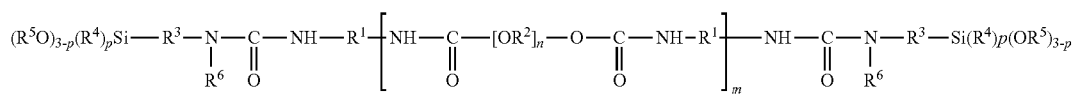
(III)

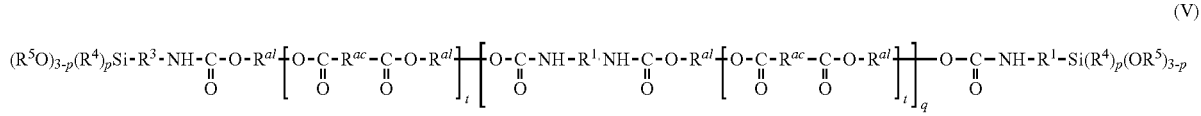
(IV)

(V)
$(R^5O)_{3-p}(R^4)_p Si\text{-}R^3\text{-}NH\text{-}\underset{O}{\overset{\parallel}{C}}\text{-}O\text{-}R^{al}\underset{t}{\overbrace{\left[O\text{-}\underset{O}{\overset{\parallel}{C}}\text{-}R^{ac}\text{-}\underset{O}{\overset{\parallel}{C}}\text{-}O\text{-}R^{al}\right]}}\underset{q}{\overbrace{\left[O\text{-}\underset{O}{\overset{\parallel}{C}}\text{-}NH\text{-}R^1\text{-}NH\text{-}\underset{O}{\overset{\parallel}{C}}\text{-}O\text{-}R^{al}\underset{t}{\overbrace{\left[O\text{-}\underset{O}{\overset{\parallel}{C}}\text{-}R^{ac}\text{-}\underset{O}{\overset{\parallel}{C}}\text{-}O\text{-}R^{al}\right]}}\right]}}\text{-}O\text{-}\underset{O}{\overset{\parallel}{C}}\text{-}NH\text{-}R^1\text{-}Si(R^4)_p(OR^5)_{3-p}$ 1. Silyl Polymer The silyl polymer comprises at least one hydrolyzable alkoxysilane group, preferably as an end group, and preferably at least two hydrolyzable alkoxysilane groups, preferentially as end groups.

The silyl polymer may be a polymer comprising at least one, preferably at least two, groups of formula (I), in particular as end groups:

—Si(R$^4$)$_p$(OR$^5$)$_{3-p}$  (I)

in which:
  R$^4$ and R$^5$, which may be identical or different, each represent a linear or branched alkyl radical comprising from 1 to 4 carbon atoms;
  p is an integer equal to 0, 1 or 2.

When p=2, the groups R$^4$ may be identical or different.
When p=1 or p=0, the groups R$^5$ may be identical or different.

According to the invention, the silyl polymer comprising at least one hydrolyzable alkoxysilane group, preferably at least two, may bear a polyether main chain, a polyester main chain, a polyester-polyether-polyester main chain, a polyether-polyester-polyether main chain, a polyolefin main chain, a polycaprolactone main chain, a polyacrylate main chain, a polycarbonate main chain, a polyether-polycarbonin which:
  R$^1$ represents a divalent hydrocarbon-based radical comprising from 5 to 15 carbon atoms, which may be aromatic or aliphatic, linear, branched or cyclic,
  R$^0$ represents a linear or branched divalent alkylene radical comprising from 3 to 6 carbon atoms,
  R$^3$ represents a linear or branched divalent alkylene radical comprising from 1 to 6 carbon atoms, R$^3$ preferably representing methylene or n-propylene,
  R$^2$ represents a linear or branched divalent alkylene radical comprising from 2 to 4 carbon atoms,
  R$^4$ and R$^5$, which may be identical or different, each represent a linear or branched alkyl radical comprising from 1 to 4 carbon atoms,
  R$^6$ represents a hydrogen atom, a phenyl radical, a linear, branched or cyclic alkyl radical comprising from 1 to 6 carbon atoms, or a 2-succinate radical of formula:

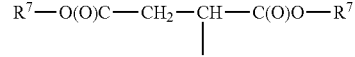

in which R$^7$ is a linear or branched alkyl radical comprising from 1 to 6 carbon atoms, n is an integer such that the number-average molecular mass of the polyether block of formula —[OR²]ₙ— ranges from 300 g/mol to 40 000 g/mol in the polymers of formulae (II), (III) and (IV), $m_1$ is zero or an integer, n and $m_1$ are such that the number-average molecular mass of the polymer of formula (III) ranges from 500 g/mol to 50 000 g/mol, preferably from 700 g/mol to 20 000 g/mol, m is an integer other than zero, n and m are such that the number-average molecular mass of the polymer of formula (IV) ranges from 500 g/mol to 50 000 g/mol, preferably from 700 g/mol to 20 000 g/mol, p is an integer equal to 0, 1 or 2, p preferably being 0 or 1, $R^{al}$ represents a divalent hydrocarbon-based radical derived from a diol by replacement of each of the two hydroxyl groups with a free valency;

$R^{ac}$ represents a divalent hydrocarbon-based radical derived from a dicarboxylic acid by replacement of each of the two carboxyl groups —COOH with a free valency;

t is a number such that the polyester diol of formula (VI):

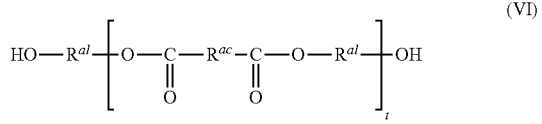

(VI)

has a hydroxyl number $I_{OH}$ of between 4 and 60 mg KOH/g;

q is an integer other than zero, t and q are such that the number-average molecular mass of the polymer of formula (V) is between 400 g/mol and 50 000 g/mol.

Preferably, the radical $R^1$ of formulae (II), (III), (IV) and (V) is chosen from one of the following divalent radicals, the formulae of which below show the two free valencies:

a) the divalent radical derived from isophorone diisocyanate (IPDI):

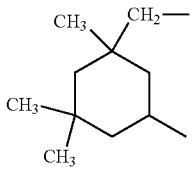

b) the divalent radical derived from 4,4'- and 2,4'-dicyclohexylmethane diisocyanate (HMDI)

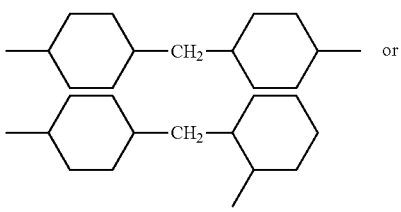

c) the radical derived from 2,4- and 2,6-toluene diisocyanate (TDI)

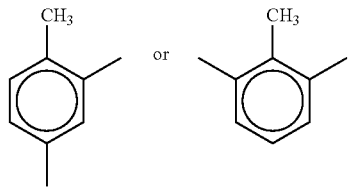

d) the radical derived from 4,4'- and 2,4'-diphenylmethane diisocyanate (MDI)

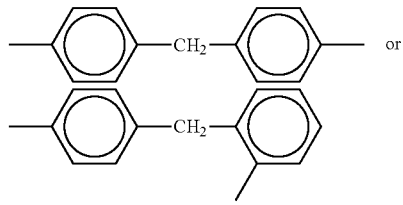

e) the radical derived from m-xylylene diisocyanate (m-XDI)

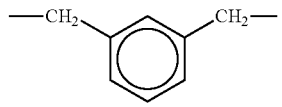

f) the radical derived from hexamethylene diisocyanate (IPDI)

—(CH₂)₆—

Preferably, the radical $R^1$ of formulae (II), (III), (IV) and (V) is the divalent radical derived from isophorone diisocyanate or from xylylene diisocyanate.

The polymers of formula (III) may be obtained according to a process described in EP 2336208 and WO 2009/106699.

Among the polymers corresponding to formula (III), examples that may be mentioned include:

Geniosil® STP-E10 (available from Wacker): polyether comprising two groups (I) of dimethoxy type ($m_1$ equal to 0, p equal to 1 and $R^4$ and $R^5$ represent a methyl group) having a number-average molecular mass of about 8889 g/mol where $R^3$ represents a methylene group;

Geniosil® STP-E30 (available from Wacker): polyether comprising two groups (1) of dimethoxy type (m, equal to 0, p equal to 1 and $R^4$ and $R^5$ represent a methyl group) having a number-average molecular mass of about 14 493 g/mol where $R^3$ represents a methylene group;

Spur+® 1050MM (available from Momentive): polyether-polyurethane comprising two groups of formula (I) of trimethoxy type ($m_1$ other than 0, p equal to 0 and $R^5$ represents a methyl group) having a number-average molecular mass of about 16 393 g/mol where $R^3$ represents an n-propylene group;

SPUR+® Y-19116 (available from Momentive): polyether-polyurethane comprising two groups of formula (I) of trimethoxy type ($m_1$ other than 0 and $R^5$ represents a methyl group) having a number-average molecular mass ranging from 15 000 to 17 000 g/mol g/mol where $R^3$ represents an n-propylene group;

Desmoseal® S XP 2636 (available from Bayer): polyether comprising two groups of formula (I) of trimethoxy type ($m_1$ equal to 0, p equal to 0 and $R^5$ represents a methyl group) having a number-average molecular mass of about 15 038 g/mol where $R^3$ represents an n-propylene group.

The polymers of formula (II) may be obtained by hydrosilylation of polyether diallyl ether according to a process described, for example, in EP 1 829 928.

Among the polymers corresponding to the formula (II), mention may be made of:

MS Polymer™ S303H (available from Kaneka) corresponding to a polyether comprising two groups of formula (I) of dimethoxy type (p equal to 1 and $R^4$ represents a methyl group) having a number-average molecular mass of about 22 000 g/mol and a viscosity of 12.5 Pa·s at 23° C.;

MS Polymer™ S227 (available from Kaneka) corresponding to a polyether comprising two groups of formula (I) of dimethoxy type (p equal to 1 and $R^5$ and $R^4$ each represent a methyl group) having a number-average molecular mass of about 27 000 g/mol and a viscosity of 34 Pa·s at 23° C.

The polymers of formula (IV) may be obtained according to the following process:

a) reaction of a polyether polyol having the following formula:

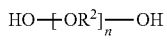

with a stoichiometric excess of diisocyanate having the following formula: NCO—$R^1$—NCO to form a polyurethane-polyether block bearing at least two —NCO end groups, said block preferably comprising from 1.5% to 1.9% by weight of —NCO groups, and then b) reaction between a block obtained in the preceding step with a stoichiometric amount or a slight excess of an α-, β- or γ-aminosilane having the following formula:

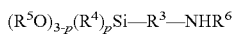

Such a process is described, for example, in WO 2013/136108.

Among the polymers corresponding to formula (IV), examples that may be mentioned include:

Spur+1015 LM (available from Momentive) corresponding to a polyether-polyurethane comprising two groups of formula (I) of trimethoxy type (p equal to 0 and $R^5$ represents a methyl group) having a number-average molecular mass of about 25 000 g/mol and a viscosity of 50 Pa·s at 23° C.

The polymers of formula (V) may be those described in patent application EP 2 865 694. They may be prepared according to the process described in said patent application.

According to one embodiment, the polymer of formula (V) is a polymer of formula (V-A) in which:

$R^{al}$ represents a divalent hydrocarbon-based radical which is derived from a fatty alcohol dimerized by replacing each of the two hydroxyl groups with a free valency, said alcohol having a hydroxyl number $I_{OH}$ of between 200 and 220 mg KOH/g; and $R^{ac}$ represents a divalent hydrocarbon-based radical which is derived from a fatty acid dimerized by replacing each of the two carboxyl groups —COOH with a free valency, said acid having an acid number $I_A$ of between 190 and 200 mg KOH/g.

Preferably, in the polymer of formula (V-A), t is a number such that the polyester diol of formula (VI):

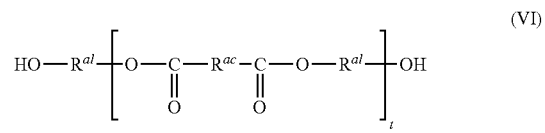

has a hydroxyl number $I_{OH}$ of between 45 and 55 mg KOH/g.

The polymers of formula (V-A) may be obtained according to the process described in patent application EP 2 865 728 (in particular on pages 5 to 9).

Preferably, the polymers of formula (V-A) have a number-average molecular mass ranging from 900 to 15 000 g/mol.

According to one embodiment, the polymer of formula (V) is a polymer of formula (V-B) in which:

$R^{al}$ represents a divalent hydrocarbon-based radical derived from a saturated diol by replacing each of the two hydroxyl groups with a free valency, said diol having a hydroxyl number $I_{OH}$ of greater than 220 mg KOH/g; and $R^{ac}$ represents a divalent hydrocarbon-based radical derived from a saturated dicarboxylic acid by replacing each of the two carboxyl groups —COOH with a free valency, said acid having an acid number $I_A$ of greater than 200 mg KOH/g.

Preferably, in the polymer of formula (V-B), t is a number such that the polyester diol of formula (VI):

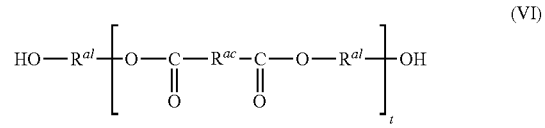

has a hydroxyl number $I_{OH}$ of between 4 and 24 mg KOH/g, in particular between 9 and 24 mg KOH/g.

The polymers of formula (V-B) may be obtained via a process which comprises several sequential steps:

1st Step: Preparation of a Polyester of Formula (VI) with a Hydroxyl Number $I_{OH}$ of Between 4 and 24 mg KOH/g The polyester of formula (VI) may be prepared via a polycondensation reaction between:

(i) at least one saturated dicarboxylic acid with an acid number $I_A$ of greater than 200 mg KOH/g; and (ii) at least one saturated diol with a hydroxyl number $I_{OH}$ of greater than 220 mg KOH/g;

on condition, preferably, that at least one saturated dicarboxylic acid of composition (A-1-1) or at least one saturated diol of composition (A-1-2) is branched.

In the present text:

the acid number $I_A$ of a dicarboxylic acid is the number of carboxylic functions per gram of acid, said number being expressed in the form of equivalent in milligrams of KOH necessary to neutralize the acidity of 1 g of acid, determined by titrimetry, said number being related to the number-average molecular mass M of said acid by the following relationship:

$I_A = (56.1 \times 2 = 1000)/M$ the hydroxyl number $I_{OH}$ of a diol is the number of hydroxyl functions per gram of diol, said number being expressed in the form of equivalent in milligrams of KOH used in the assay of the hydroxyl functions, determined by titrimetry according to the standard ISO 14900:2001, said number being related to the number-average molecular mass M' of said diol by the relationship:

$$I_{OH}=(56.1\times 2\times 1000)/M'$$

Preferably, the saturated dicarboxylic acid(s) have an acid number $I_A$ of greater than or equal to 300 mg KOH/g, preferably greater than or equal to 400 mg KOH/g, preferentially greater than or equal to 500 mg KOH/g, in particular greater than or equal to 700 mg KOH/g, and advantageously greater than or equal to 800 mg KOH/g. Preferably, the saturated dicarboxylic acid(s) have an acid number $I_A$ equal to 555 mg KOH/g or equal to 768 mg KOH/g.

The dicarboxylic acid may be linear or branched, preferably linear, aliphatic or cycloaliphatic.

The dicarboxylic acid according to the invention may be chosen from the group consisting of malonic acid, succinic acid, fumaric acid, glutaric acid, adipic acid, 1,3- or 1,4-cyclohexanedicarboxylic acid, 3-methyl-1,5-pentanedicarboxylic acid, 1,10-decanedicarboxylic acid, 1,12-dodecanedicarboxylic acid, 1,18-octadecanedicarboxylic acid, methyltetrahydrophthalic acid, hexahydrophthalic acid, tetrahydrophthalic acid, azelaic acid, sebacic acid, and mixtures thereof. Preferably, the dicarboxylic acid is adipic acid or sebacic acid.

Preferably, the saturated diol(s) have a hydroxyl number $I_{OH}$ of greater than or equal to 500 mg KOH/g, preferably greater than or equal to 700 mg KOH/g, even more preferentially greater than or equal to 900 mg KOH/g. Preferably, the saturated diol(s) of composition (A-1-2) have a hydroxyl number $I_{OH}$ equal to 950 mg KOH/g, or equal to 1078 mg KOH/g, or equal to 1808 mg KOH/g.

The diol used may be aromatic or aliphatic (preferably aliphatic), linear or branched, preferably branched.

The diol according to the invention may be chosen from the group consisting of ethylene glycol (CAS: 107-21-1), diethylene glycol, triethylene glycol, tetraethylene glycol, 1,2-propanediol, dipropylene glycol, tripropylene glycol, tetrapropylene glycol, 1,6-hexanediol, 3-ethyl-2-methyl-1,5-pentanediol, 2-ethyl-3-propyl-1,5-pentanediol, 2,4-dimethyl-3-ethyl-1,5-pentanediol, 2-ethyl-4-methyl-3-propyl-1,5-pentanediol, 2,3-diethyl-4-methyl-1,5-pentanediol, 3-ethyl-2,2,4-trimethyl-1,5-pentanediol, 2,2-dimethyl-4-ethyl-3-propyl-1,5-pentanediol, 2-methyl-2-propyl-1,5-pentanediol, 2,4-dimethyl-3-ethyl-2-propyl-1,5-pentanediol, 2,3-dipropyl-4-ethyl-2-methyl-1,5-pentanediol, 2-butyl-2-ethyl-1,5-pentanediol, 2-butyl-2,3-diethyl-4-methyl-1,5-pentanediol, 2-butyl-2,4-diethyl-3-propyl-1,5-pentanediol, 3-butyl-2-propyl-1,5-pentanediol, 2-methyl-1,5-pentanediol (CAS: 42856-62-2), 3-methyl-1,5-pentanediol (MPD, CAS: 4457-71-0), 2,2-dimethyl-1,3-pentanediol (CAS: 2157-31-5), 2,2-dimethyl-1,5-pentanediol (CAS: 3121-82-2), 3,3-dimethyl-1,5-pentanediol (CAS: 53120-74-4), 2,3-dimethyl-1,5-pentanediol (CAS: 81554-20-3), 2,2-dimethyl-1,3-propanediol (neopentyl glycol—NPG, CAS: 126-30-7), 2,2-diethyl-1,3-propanediol (CAS: 115-76-4), 2-methyl-2-propyl-1,3-propanediol (CAS: 78-26-2), 2-butyl-2-ethyl-1,3-propanediol (CAS: 115-84-4), 2-methyl-1,3-propanediol (CAS: 2163-42-0), 2-benzyloxy-1,3-propanediol (CAS: 14690-00-7), 2,2-dibenzyl-1,3-propanediol (CAS: 31952-16-6), 2,2-dibutyl-1,3-propanediol (CAS: 24765-57-9), 2,2-diisobutyl-1,3-propanediol, 2,4-diethyl-1,5-pentanediol, 2-ethyl-1,6-hexanediol (CAS: 15208-19-2), 2,5-dimethyl-1,6-hexanediol (CAS: 49623-11-2), 5-methyl-2-(1-methylethyl)-1,3-hexanediol (CAS: 80220-07-1), 1,4-dimethyl-1,4-butanediol, 1,5-hexanediol (CAS: 928-40-5), 3-methyl-1,6-hexanediol (CAS: 4089-71-8), 3-tert-butyl-1,6-hexanediol (CAS: 82111-97-5), 1,3-heptanediol (CAS: 23433-04-7), 1,2-octanediol (CAS: 1117-86-8), 1,3-octanediol (CAS: 23433-05-8), 2,2,7,7-tetramethyl-1,8-octanediol (CAS: 27143-31-3), 2-methyl-1,8-octanediol (CAS: 109359-36-6), 2,6-dimethyl-1,8-octanediol (CAS: 75656-41-6), 1,7-octanediol (CAS: 3207-95-2), 4,4,5,5-tetramethyl-3,6-dioxa-1,8-octanediol (CAS: 76779-60-7), 2,2,8,8-tetramethyl-1,9-nonanediol (CAS: 85018-58-2), 1,2-nonanediol (CAS: 42789-13-9), 2,8-dimethyl-1,9-nonanediol (CAS: 40326-00-9), 1,5-nonanediol (CAS: 13686-96-9), 2,9-dimethyl-2,9-dipropyl-1,10-decanediol (CAS: 85018-64-0), 2,9-dibutyl-2,9-dimethyl-1,10-decanediol (CAS: 85018-65-1), 2,9-dimethyl-2,9-dipropyl-1,10-decanediol (CAS: 85018-64-0), 2,9-diethyl-2,9-dimethyl-1,10-decanediol (CAS: 85018-63-9), 2,2,9,9-tetramethyl-1,10-decanediol (CAS: 35449-36-6), 2-nonyl-1,10-decanediol (CAS: 48074-20-0), 1,9-decanediol (CAS: 128705-94-2), 2,2,6,6,10,10-hexamethyl-4,8-dioxa-1,11-undecanediol (CAS: 112548-49-9), 1-phenyl-1,11-undecanediol (CAS: 109217-58-5), 2-octyl-1,11-undecanediol (CAS: 48074-21-1), 2,10-diethyl-2,10-dimethyl-1,11-undecanediol (CAS: 85018-66-2), 2,2,10,10-tetramethyl-1,11-undecanediol (CAS: 35449-37-7), 1-phenyl-1,11-undecanediol (CAS: 109217-58-5), 1,2-undecanediol (CAS: 13006-29-6), 1,2-dodecanediol (CAS: 1119-87-5), 2,11-dodecanediol (CAS: 33666-71-6), 2,11-diethyl-2,11-dimethyl-1,12-dodecanediol (CAS: 85018-68-4), 2,11-dimethyl-2,11-dipropyl-1,12-dodecanediol (CAS: 85018-69-5), 2,11-dibutyl-2,11-dimethyl-1,12-dodecanediol (CAS: 85018-70-8), 2,2,11,11-tetramethyl-1,12-dodecanediol (CAS: 5658-47-9), 1,11-dodecanediol (CAS: 80158-99-2), 11-methyl-1,7-dodecanediol (CAS: 62870-49-9), 1,4-dodecanediol (CAS: 38146-95-1), 1,3-dodecanediol (CAS: 39516-24-0), 1,10-dodecanediol (CAS: 39516-27-3), 2,11-dimethyl-2,11-dodecanediol (CAS: 22092-59-7), 1,5-dodecanediol (CAS: 20999-41-1), 6,7-dodecanediol (CAS: 91635-53-9), and mixtures thereof. Preferably, the diol is chosen from the group consisting of ethylene glycol (CAS: 107-21-1), 1,6-hexanediol, 3-methyl-1,5-pentanediol (MPD, CAS: 4457-71-0), 2,2-dimethyl-1,3-propanediol (neopentyl glycol—NPG, CAS: 126-30-7), and mixtures thereof.

Preferably, the polyester of formula (VI) is obtained by polycondensation reaction between:
  adipic acid; and
  a mixture of neopentyl glycol, ethylene glycol and 1,6-hexanediol;
  or else:
  adipic acid; and
  3-methyl-1,5-pentanediol.

Preferably, the polyester diol of formula (VI) has a hydroxyl number $I_{OH}$ of between 4 and 24 mg KOH/g, preferentially between 7 and 24 mg KOH/g, preferably between 7 and 20 mg KOH/g and in particular between 9 and 19 mg KOH/g. Preferably, the hydroxyl number $I_{OH}$ is between 9 and 24 mg KOH/g.

The polyester diol of formula (VI) may have a glass transition temperature $T_g$ of less than 0° C., preferably less than or equal to −20° C., preferably less than or equal to −40° C., preferentially less than or equal to −50° C., in particular less than or equal to −60° C., for example less than or equal to −64° C.

The polyester diol of formula (VI) may have a number-average molecular mass of greater than or equal to 5500 g/mol, preferably greater than or equal to 6000 g/mol, in particular strictly greater than 6000 g/mol, preferentially greater than or equal to 8000 g/mol, in particular greater than or equal to 9000 g/mol, for example greater than or equal to 10000 g/mol, advantageously greater than or equal to 12000 g/mol and in particular greater than or equal to 18000 g/mol.

The number-average molecular mass of the polyester diol of formula (VI) may be determined from its $I_{OH}$ and from its functionality.

Among the amorphous polyester diols of formula (VI), examples that may be mentioned include Dynacoll® 7250 sold by Evonik (polyester polyol with a viscosity of 180 Pa·s at 23° C., a number-average molecular mass Mn equal to 5500 g/mol, and a $T_g$ equal to −50° C.), Kuraray® P-6010 sold by Kuraray (polyester polyol with a viscosity of 68 Pa·s at 23° C., a number-average molecular mass Mn equal to 6000 g/mol, and a $T_g$ equal to −64° C.), or Kuraray® P-10010 sold by Kuraray (polyester polyol with a viscosity of 687 Pa·s at 23° C., a number-average molecular mass Mn equal to 10000 g/mol).

2$^{nd}$ Step: Preparation of the Polymer of Formula (V)

According to a first variant, the abovementioned polyester(s) (VI) may be reacted with the isocyanatosilane of formula (VII):

$$NCO—R^3—Si(R^4)_p(OR^5)_{3-p} \quad \text{(VII)}$$

in an amount corresponding to a molar equivalent ratio of the number of NCO/OH functions of between 0.90 and 1.05 and preferably equal to about 1.

This step is in particular performed under anhydrous conditions, so as to avoid hydrolysis of the alkoxysilane groups. A typical temperature range for performing this reaction step is from 30° C. to 120° C., and more particularly from 60° C. to 105° C.

The abovementioned isocyanatosilanes of formula (VII) are widely commercially available. Mention may be made especially of Silquest® A-Link 35, i.e. (3-isocyanatopropyl)trimethoxysilane) available from Momentive, Silquest® A-Link 25, i.e. (3-isocyanatopropyl)triethoxysilane) available from Momentive, (3-isocyanatopropyl)methyldimethoxysilane available from Gelest, Geniosil® XL 42, i.e. (3-isocyanatomethyl)methyldimethoxysilane available from Wacker, and Geniosil® XL 43, i.e. (3-isocyanatomethyl)trimethoxysilane available from Wacker.

According to a second variant, composition (A) may be obtained in two steps from composition (A-1):
a) reaction of the polyester polyol(s) of formula (VI) with a diisocyanate of formula NCO—R$^1$—NCO in amounts corresponding to a molar equivalent ratio of the number of NCO/OH functions of between 0.3 and 0.7 and preferably equal to about 0.5, to form a polyester-polyurethane block;
b) reaction between a block obtained in the preceding step with the isocyanatosilane having the following formula NCO—R$^3$—Si(R$^4$)$_p$(OR$^5$)$_{3-p}$, in an amount corresponding to a molar equivalent ratio of the number of NCO/OH functions of between 0.90 and 1.05 and preferably equal to about 1.

The isocyanatosilanes may be those mentioned above.

Preferably, the silyl polymer according to the invention is a polymer of formula (III) in which:
m$_1$ is an integer equal to 0,
p=1,
R$^4$ and R$^5$ each represent a methyl radical,
R$^3$ represents a divalent methylene radical,
the number-average molar mass of said polymer ranges from 5000 to 30000 g/mol, preferentially from 10000 to 20000 g/mol, in particular from 14000 to 15000 g/mol.

Preferably, the silyl polymer according to the invention is a polymer of formula (III) in which:
m$_1$ is an integer other than 0,
p=0,
R$^3$ represents a divalent propylene radical,
R$^5$ represents a methyl radical,
the number-average molecular mass of said polymer ranges from 5000 to 30000 g/mol, preferentially from 10000 to 30000 g/mol, in particular from 15000 to 25000 g/mol.

Preferably, the silyl polymer according to the invention is a polymer of formula (V) in which:
q is an integer other than 0,
p=0,
R$^3$ represents a divalent propylene radical,
R$^5$ represents a methyl radical,
the number-average molecular mass of said polymer ranges from 5000 to 30000 g/mol, preferentially from 10000 to 30000 g/mol, in particular from 15000 to 25000 g/mol.

According to one embodiment, the abovementioned composition A comprises from 3% to 90% by weight, preferably from 5% to 80% by weight, preferentially from 10% to 70% by weight, advantageously from 20% to 60% by weight of at least one silyl polymer comprising at least one alkoxysilane group, preferably chosen from the polymers of the abovementioned formulae (II), (III), (IV), (V) or (VI), and mixtures thereof, relative to the total weight of said composition A.

According to one embodiment, the multi-component adhesive composition according to the invention comprises from 3% to 90% by weight, preferably from 5% to 80% by weight, preferentially from 10% to 70% by weight, advantageously from 20% to 60% by weight of at least one silyl polymer comprising at least one alkoxysilane group, preferably chosen from the polymers of the abovementioned formulae (II), (III), (IV), (V) or (VI), and mixtures thereof, relative to the total weight of said adhesive composition.

2. Tackifying Resin

The tackifying resin(s) that may be used in the adhesive composition according to the invention may be any resin that is compatible with the silyl polymer(s).

The term "compatible tackifying resin" means a tackifying resin which, when mixed in 50%/50% proportions by weight with the silyl polymer(s), gives a substantially homogeneous mixture (no visually observed phase separation).

The tackifying resins are advantageously chosen from:
(i) resins obtained by polymerization of terpene hydrocarbons and phenols, in the presence of Friedel-Crafts catalyst(s);
(ii) resins obtained via a process comprising the polymerization of α-methylstyrene, optionally in the presence of phenols;
(iii) rosins of natural origin or modified rosins (for instance the rosin extracted from pine gum, wood rosin extracted from tree roots) and derivatives thereof which are hydrogenated, dimerized, polymerized or esterified with monoalcohols or polyols (for instance glycerol or pentaerythritol);
(iv) acrylic resins in particular having a viscosity at 100° C. of less than 100 Pa·s;
(v) terpene resins;

(vi) copolymers based on natural terpenes, for instance styrene/terpene, α-methylstyrene/terpene and vinyltoluene/terpene; and
(viii) mixtures thereof.

Such resins are commercially available and, among those of the type (i), (ii), (iii) or (iv), examples that may be mentioned include the following products:

resins of type (i): Dertophene® 1510 available from the company DRT, with a number-average molecular mass Mn of about 870 Da; Dertophene® H150 available from the company DRT, with a number-average molecular mass Mn of about 630 Da; Sylvarez® TP 95 available from the company Arizona Chemical, with a number-average molecular mass Mn of about 1200 Da;

resins of type (ii): Cleartack® W100 available from the company Cray Valley, which is obtained by polymerization of α-methylstyrene without action of phenols, with a number-average molecular mass of 900 Da; Sylvarez® 510, which is available from the company Arizona Chemical, with a number-average molecular mass Mn of about 1740 Da, the process for the production of which comprises the addition of phenols;

resins of type (iii): Sylvalite® RE 100, which is an ester of rosin and of pentaerythritol available from the company Arizona Chemical, and the number-average molecular mass of which is about 1700 Da.

According to a preferred embodiment, the tackifying resin is chosen from resins of type (i).

The tackifying resin preferably has a number-average molecular mass ranging from 100 to 6000 g/mol, preferably from 300 to 4000 g/mol, preferentially from 500 to 2000 g/mol.

The number-average molecular masses of the tackifying resins may be measured by methods that are well known to those skilled in the art, for example by size exclusion chromatography using a polystyrene-type standard.

The tackifying resin may have a hydroxyl number $I_{OH}$ ranging from 10 to 300 mg KOH/g, preferably ranging from 100 to 200 mg KOH/g, preferentially ranging from 140 to 160 mg KOH/g. In particular, the tackifying resin has a hydroxyl number of 145 mg KOH/g.

The hydroxyl number of the tackifying resin represents the number of hydroxyl functions per gram of tackifying resin, and is expressed in the form of the equivalent number of milligrams of potassium hydroxide per gram of tackifying resin (mg KOH/g) for the assay of the hydroxyl functions.

The abovementioned composition A may comprise from 15% to 80%, preferably from 20% to 70%, preferentially from 25% to 70%, in particular from 30% to 60%, advantageously from 40% to 60% by weight of at least one tackifying resin.

The content of tackifying resin(s) may represent from 15% to 80%, preferably from 20% to 70%, preferentially from 25% to 70%, in particular from 30% to 60%, advantageously from 40% to 60% of the weight of the multicomponent adhesive composition.

3. Other Additives

The abovementioned composition A may comprise at least one other additive, chosen, for example, from the group consisting of plasticizers, solvents, pigments, dyes, adhesion promoters, moisture absorbers, UV stabilizers, antioxidants, glitter flakes, fluorescent materials, rheological additives, fillers, flame retardants, waxes, and mixtures thereof.

The filler may be chosen from organic fillers, inorganic fillers and mixtures thereof.

As organic filler(s), use may be made of any organic filler and especially polymeric fillers customarily used in the field of adhesives. Use may be made, for example, of polyvinyl chloride (PVC), one or more polyolefins, rubber, ethylene-vinyl acetate (EVA), aramid fibers, for instance Kevlar®, hollow microspheres made of expandable or non-expandable thermoplastic polymer (for instance hollow vinylidene chloride/acrylonitrile microspheres), one or more thermoplastic polymers chosen from those used in the preparation of HMPSAs, such as ethylene-vinyl acetate (EVA), or styrene block copolymers (such as SIS, SBS, SIBS, SEBS, SEPS, and derivatives thereof grafted, for example, with maleic anhydride).

The filler may be an expander (also known as a swelling agent).

The filler may be in the form of hollow beads, i.e. beads containing a gas, or of beads that can be expanded to form hollow beads, i.e. beads containing a void or a gas.

Preferably, the filler is an inorganic filler.

According to one embodiment, the filler is chosen from sand, precipitated and/or fumed silica, zeolites, glass beads, glass, quartz, barite, alumina, mica, talc, alkali metal or alkaline-earth metal carbonates (for example calcium carbonate).

The filler(s) preferably represent from 0% to 15% by weight, preferably from 0% to 10% by weight, preferentially from 0% to 5% by weight, relative to the total weight of composition A.

According to one embodiment, composition A does not comprise any filler.

Composition A may also comprise at least one plasticizer. The total content of plasticizers in composition A may range from 0% to 30% by weight, preferably from 1% to 30% by weight or even, for example, from 1% to 15% by weight relative to the total weight of said composition A.

As examples of plasticizers that may be used, use may be made of any plasticizer usually used in the field of adhesives, for instance phthalates, benzoates, trimethylolpropane esters, trimethylolethane esters, trimethylolmethane esters, glycerol esters, pentaerythritol esters, naphthenic mineral oils, adipates, cyclohexyldicarboxylates, paraffinic oils, natural oils (optionally epoxidized), polypropylenes, polybutylenes, hydrogenated polyisoprenes, and mixtures thereof.

Among the phthalates, examples that may be mentioned include diisononyl phthalate, diisobutyl phthalate, dioctyl phthalate, dicyclohexyl phthalate, diisooctyl phthalate, diisododecyl phthalate, dibenzyl phthalate or butylbenzyl phthalate.

Among the benzoates, examples that may be mentioned include: neopentyl glycol dibenzoate (available, for example, under the name Uniplex® 512 from Lanxess), dipropylene glycol dibenzoate (available, for example, under the name Benzoflex® 9-88SG from Eastman), a mixture of diethylene glycol dibenzoate and of dipropylene glycol dibenzoate (available, for example, under the name K-Flex® 850 S from Kalama Chemical), or a mixture of diethylene glycol dibenzoate, dipropylene glycol dibenzoate and triethylene glycol dibenzoate (available, for example, under the name Benzoflex® 2088 from Eastman).

Among the pentaerythritol esters, examples that may be mentioned include pentaerythrityl tetravalerate (available, for example, under the name Pevalen™ from the company Pestorp).

Among the cyclohexanedicarboxylates, an example that may be mentioned is diisononyl 1,2-cyclohexanedicarboxylate (available, for example, under the name Hexamoll Dinch® from BASF).

Composition A may also comprise at least one rheological agent.

As examples of rheological agent(s) that may be used, mention may be made of any rheological agent customarily used in the field of adhesives.

Use is preferably made of one or more rheological agents chosen from thixotropic agents, and more preferentially from:
- PVC plastisols, corresponding to a suspension of PVC in a plasticizer that is miscible with PVC, obtained in situ by heating to temperatures ranging from 60° C. to 80° C. These plastisols may be those described especially in the publication *Polyurethane Sealants*, Robert M. Evans, ISBN 087762-998-6;
- fumed silica;
- urea derivatives derived from the reaction of an aromatic diisocyanate monomer such as 4,4'-MDI with an aliphatic amine such as butylamine. The preparation of such urea derivatives is described especially in patent application FR 1 591 172;
- waxes of micronized amides, such as Crayvallac® SL, Crayvallac® SLX, Crayvallac® SLT sold by Arkema.

The total content of rheological agents that may be used may range from 0% to 30% by weight, preferably from 0.1% to 20% by weight, more preferentially from 1% to 10% by weight relative to the total weight of composition A.

When a pigment is present in composition A, its content is preferably less than or equal to 3% by weight, more preferably less than or equal to 2% by weight, relative to the total weight of the composition. When it is present, the pigment may represent, for example, from 0.1% to 3% by weight or from 0.4% to 2% by weight relative to the total weight of composition A.

The pigments may be organic or inorganic pigments.

For example, the pigment is $TiO_2$, in particular Kronos® 2059 sold by the company Kronos.

The moisture absorber, if it is present, may be chosen, for example, from non-polymeric hydrolyzable alkoxysilane derivatives, with a molecular mass of less than 500 g/mol, preferably chosen from trimethoxysilane and triethoxysilane derivatives. Such an agent may typically extend the storage life of the composition during storage and transportation before its use. Examples that may be mentioned include gamma-methacryloxypropyltrimethoxysilane (available, for example, under the trade name Silquest® A-174 from the company Momentive), methacryloxymethyltrimethoxysilane (available, for example, under the name Geniosil® XL33 from Wacker), vinyltrimethoxysilane, isooctyltrimethoxysilane or phenyltrimethoxysilane.

The content of moisture absorber is preferably less than or equal to 3% by weight, more preferably less than or equal to 2% by weight, relative to the total weight of composition A. When it is present, the moisture absorber may represent, for example, from 0.1% to 3% by weight or from 1% to 2% by weight relative to the total weight of composition A.

Composition A may comprise an amount of from 0.1% to 3%, preferably from 1% to 3%, by weight of at least one UV stabilizer or antioxidant. These compounds are typically introduced to protect the composition from degradation resulting from a reaction with oxygen which is liable to be formed by the action of heat or light. These compounds may include primary antioxidants which trap free radicals. The primary antioxidants may be used alone or in combination with other secondary antioxidants or UV stabilizers.

Examples that may be mentioned include Irganox® 1010, Irganox® B561, Irganox® 245, Irgafos® 168 sold by BASF.

According to one embodiment, the abovementioned composition A is substantially free of cocatalyst, i.e. the total content of cocatalyst(s) in composition A is less than or equal to 1000 ppm, preferably less than or equal to 500 ppm, preferentially less than or equal to 200 ppm, advantageously less than or equal to 100 ppm, or even less than or equal to 50 ppm. Preferably, the content of cocatalyst in composition A is equal to 0 ppm.

In the context of the invention, the term "cocatalyst" is used to refer to a catalyst other than that of composition B. The cocatalyst(s) may be of nature identical to or different from that of the catalyst of composition B.

Composition A may contain components which may serve for a system of curing other than the curing induced by the silane functions with each other. They may be, for example, components comprising acrylic or epoxide functions. For the purposes of this alternative curing, these components may react with other components contained in composition B.

Composition A may be prepared by mixing all of the components of said composition A, irrespective of the order of incorporation of the various components. Several components of composition A may be mixed together, and then subsequently mixed with the other component(s) of said composition A.

The mixing may be performed at a temperature ranging from 23 to 200° C.

Composition B

1. Catalyst

The catalyst is typically a curing catalyst.

The catalyst of composition B may be chosen from the group consisting of amines, organometallic compounds, acids and derivatives thereof, and mixtures thereof.

It may be a mixture of catalysts of the same family (for example a mixture of several amines), or a mixture of catalysts of different families (for example a mixture of an amine and of an organometallic compound).

In the context of the invention, the term "organometallic compounds" means compounds comprising an organic radical and at least one metal.

In the context of the invention, the term "organic radical" means a radical comprising at least one carbon atom.

The organometallic compounds may comprise organometallic compounds (compounds comprising at least one metal-carbon covalent bond), metal alkoxides, metal carboxylates, and metallic coordination complexes with one or more organic ligands.

Examples of organic ligands that may be mentioned include acetylacetonate and oximes.

The metal atom of the organometallic compounds may be any metal atom known to those skilled in the art, and may be chosen in particular from tin, aluminum, zinc, cobalt, iron, nickel, bismuth, titanium, or zirconium. The organometallic compounds may moreover comprise several metal atoms.

The organometallic compounds (compounds comprising at least one metal-carbon covalent bond) may be carboxylates of organometallic compounds.

The organometallic compounds may be chosen from the group consisting of dibutyltin dilaurate (DBTL), dibutyltin diacetate, dibutyltin diethylhexanoate, dioctyltin dineodecanoate (available, for example, under the name TIB KAT® 223 from the company TIB Chemicals), dibutyltin dioleate, dibutyltin benzylmaleate, diphenyltin diacetate, and mixtures thereof.

The metal alkoxides may be chosen from the group consisting of titanium tetrabutoxide, titanium tetraisopropoxide, zirconium tetrabutoxide, zirconium tetraisopropoxide, and mixtures thereof.

The metal carboxylates may be chosen from the group consisting of zinc 2-ethylcaproate, zinc diacetate, zinc dineodecanoate, zinc diundecenoate, zinc dimethacrylate, cobalt acetylacetonate, cobalt diacetate, iron acetylacetonate, iron diacetate, nickel acetylacetonate, nickel diacetate, bismuth acetate, bismuth trioctanoate, bismuth dineodecanoate, zinc bismuth dineodecanoate, and mixtures thereof.

The metal coordination complexes with one or more organic ligands may be chosen from the group consisting of zinc acetylacetonate, titanium acetylacetonate (commercially available, for example, under the name Tyzor® AA75 from the company Dorf Ketal), titanium tetraacetylacetonate, aluminum trisacetylacetonate, aluminum chelates, for instance bis(ethyl acetoacetate) monoacetylacetonate (commercially available, for example, under the name K-KAT® 5218 from the company King Industries), zirconium tetraacetylacetonate, diisopropoxybis(ethylacetonato)titanium, and mixtures thereof.

The amines may be primary amines, secondary amines or tertiary amines.

The amines may be aminosilanes, for instance aminopropyltrimethoxysilane, N-(2-aminoethyl)-3-aminopropyltrimethoxysilane, aminopropyltriethoxysilane, N-(2-aminoethyl)-3-aminopropyltriethoxysilane, bis(gamma-trimethoxysilylpropyl)amine, N-ethyl-gamma-aminoisobutyltrimethoxysilane, or N-phenyl-gamma-aminopropyltrimethoxysilane.

Preferably, the catalyst is not an aminosilane.

Preferably, the amines are chosen from the group consisting of triethylamine, tributylamine, tetramethylguanidine, 1,8-diazabicyclo[5.4.0]-7-undecene, 1,4-diazabicyclo[2.2.2]octane, 1,5-diazabicyclo[4.3.0]non-5-ene, N,N-bis(N,N-dimethyl-2-aminoethyl)methylamine, N,N-dimethylcyclohexylamine, N,N-dimethylphenylamine, N-ethylmorpholine, and mixtures thereof.

The acid catalysts may be chosen from organic acid catalysts, inorganic acid catalysts, and mixtures thereof.

Among the inorganic acid catalysts, examples that may be mentioned include phosphoric or orthophosphoric acid, phosphorous acid, hypophosphorous acid, or sulfuric acid.

Preferably, the organic acid catalysts have a pKa of less than or equal to 6, preferably less than or equal to 4, advantageously less than or equal to 2, advantageously less than or equal to 0.

The organic acid catalysts may be chosen from sulfonic acids, carboxylic acids, organophosphate acids, organophosphonate acids, phosphonic acids, and mixtures thereof.

The sulfonic acids may be aliphatic or aromatic, optionally substituted (for example substituted with at least one substituent chosen from halogens (such as fluorine), hydroxyls, alkyls, amines, and mixtures thereof), and may be mono- or disulfonic.

The sulfonic acids may be chosen from N-alkylaminoalkylsulfonic acids and N,N-dialkylaminoalkylsulfonic acids (zwitterions), for instance 2-(N-morpholino)ethanesulfonic acid, 3-(N-morpholino)propanesulfonic acid, 4-[N-morpholino]butanesulfonic acid, 1,4-piperazinediethanesulfonic acid, N-2-hydroxyethylpiperazine-N'-2-ethanesulfonic acid, 2-(N-morpholino)ethanesulfonic acid, N-morpholinomethanesulfonic acid, N-(2-hydroxyethyl)piperazine-N'-methanesulfonic acid, piperazine-N,N'-bis(methanesulfonic acid), cyclohexylaminomethanesulfonic acid, N-[tris(hydroxymethyl)methyl]aminomethanesulfonic acid, N,N-bis(2-hydroxyethyl)aminomethanesulfonic acid; para-toluenesulfonic acid; benzenesulfonic acid; methanesulfonic acid; dodecylbenzenesulfonic acid; dodecylbenzenedisulfonic acid; dinonylnaphthalenedisulfonic acid; dinonylnaphthalenesulfonic acid; trifluoromethylsulfonic acid; and mixtures thereof.

In particular, the sulfonic acids are chosen from para-toluenesulfonic acid, benzenesulfonic acid, methanesulfonic acid, dodecylbenzenesulfonic acid, dodecylbenzenedisulfonic acid, dinonylnaphthalenedisulfonic acid, dinonylnaphthalenesulfonic acid, trifluoromethylsulfonic acid, and mixtures thereof.

Among the carboxylic acid catalysts, examples that may be mentioned include malonic acid, succinic acid, maleic acid, oxalic acid, acetic acid, lactic acid, benzoic acid, citric acid, glycolic acid, and mixtures thereof.

In the context of the invention, and unless otherwise mentioned, the term "organophosphate acid" means a phosphoric acid ester comprising at least one —OH radical. For example, methyl phosphate is an organophosphate acid comprising two —OH radicals and has the following structure:

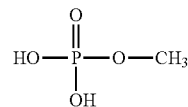

In particular, the organophosphate acids have the following formula:

$$(RO)_g-(P=O)-(OH)_h$$

in which:
R is an organic radical, in particular a radical chosen from linear or branched C1-C22 alkyls, cycloalkyls, aryls, and mixtures thereof (said alkyl, cycloalkyl and aryl groups being optionally substituted); and
g and h are integers, with g+h=3 and h=1 or 2.

The organophosphate acids may be chosen, for example, from the group consisting of C1-C22 mono- or dialkyl phosphate acids and mixtures thereof, for instance butyl phosphate, dibutyl phosphate, bis(2-ethylhexyl) phosphate, 2-ethylhexyl phosphate, and mixtures thereof; mono- or diaryl phosphates, and mixtures thereof, for instance monophenyl phosphate, diphenyl phosphate and mixtures thereof; alkyl phenyl phosphates; and mixtures thereof.

In the context of the invention, and unless otherwise mentioned, the term "organophosphonate acid" means a phosphorus-based compound having the following general formula:

$$R'-(P=O)-(OH)(OR'')$$

in which R' and R" are organic radicals, preferably chosen, independently of each other, from linear or branched C1-C22 alkyls, cycloalkyls, aryls, and mixtures thereof (said alkyl, cycloalkyl and aryl groups being optionally substituted).

Among the organophosphonate acids, examples that may be mentioned include C1-C22 monoalkyl phosphonate acids.

In the context of the invention, and unless otherwise mentioned, the term "phosphonic acid" means a phosphorus-based compound having the following general formula:

$$R'''-(P=O)-(OH)_2$$

in which R''' is an organic radical, preferably chosen from linear or branched C1-C22 alkyls, cycloalkyls, aryls, and mixtures thereof (said alkyl, cycloalkyl and aryl groups being optionally substituted).

Among the phosphonic acids, examples that may be mentioned include N-alkylaminoalkylphosphonic acids (zwitterions), N,N-dialkylaminoalkylphosphonic acids (zwitterions), C1-C20 alkylphosphonic acids, for instance methylphosphonic acid, ethylphosphonic acid, propylphosphonic acid, butylphosphonic acid, t-butylphosphonic acid, isobutylphosphonic acid, hexylphosphonic acid, 2-ethylhexylphosphonic acid and linear or branched higher homologs, benzylphosphonic acid, phenylphosphonic acid, tolylphosphonic acid, xylylphosphonic acid.

Examples of organic acid catalysts that may be mentioned include Nacure® 155 (dinonylnaphthalenedisulfonic acid, containing 55% active material in isobutanol) sold by King Industries, Nacure® 1051 (dinonylnaphthalenesulfonic acid, containing 50% active material in 2-butoxyethanol) sold by King Industries, Nacure® 5076 (dodecylbenzenesulfonic acid, containing 70% active material in isopropanol) sold by King Industries, K-Cure® 1040 (para-toluenesulfonic acid, containing 40% active material in isopropanol) sold by King Industries, Nacure® 4000 (mixture of mono- and dialkyl phosphate acids, 100% active material) sold by King Industries.

The acid derivatives according to the invention may be acid anhydrides, acid esters, acid ammonium salts, the acid being as described above.

The acid derivatives are in particular "masked" or "latent" acids which advantageously make it possible to release the acid by thermal activation (for example at a temperature ranging from 70° C. to 170° C., preferably at a temperature ranging from 90° C. to 120° C.) or by hydrolysis, or by photoactivation, preferably by thermal activation. The masked acid advantageously makes it possible to release the acid which is the species having the catalytic activity. For example, the ammonium salt formed between aminomethylpropanol and para-toluenesulfonic acid is a masked acid (acid derivative) which, by thermal activation, releases the para-toluenesulfonic acid.

The acid derivatives may be prepared via any means known to those skilled in the art starting with the corresponding acid, for example by using typical acid/base reactions. For example, the process for making an ester typically involves the condensation of an acid compound with a compound comprising a hydroxyl group, for instance an alcohol, or with a compound of oxirane type. The ammonium salts may be prepared from any abovementioned acid, with ammonia or with a primary, secondary or tertiary amine. The amines may optionally comprise at least one functional group such as a hydroxyl group (alkanolamines), a C1-C4 alkyl group. The ammonium salts (zwitterions) may also be prepared by modifying the pH of a solution containing, for example, N-alkylaminoalkylphosphonic acids, N,N-dialkyl aminoalkylphosphonic acids, N-alkylaminoalkylsulfonic acids or N,N-dialkylaminoalkylsulfonic acids.

Preferably, the catalyst is an ammonium salt of a sulfonic acid (the sulfonic acid being as described above), an ammonium salts of a phosphonic acid (the phosphonic acid being as described above), an ammonium salt of an organophosphonate acid (the organophosphonate acid being as described above), or an ammonium salt of an organophosphate acid (the organophosphate acid being as described above).

As amines for the preparation of the ammonium salts, examples that may be mentioned include 2-amino-2-methyl-1-propanol, triethylamine, aniline, pyridine, dimethylaminoethanol, alkypyridines, diisopropanolamine, dimethylethanolamine, triethanolamine, oxazolidines, bicyclic oxazolidines, amidines, diazabicyclooctanes, guanidines, N-alkylmorpholines, aminopyridines, aminoalkylpyridines, aminopyrrolidines, indazole, imidazole, pyrazole, pyrazine, pyrimidine, purine, imidazoline, pyrazoline, piperazine, aminomorpholine, aminoalkylmorpholines, and mixtures thereof. Preferably, the amines are tertiary amines.

Examples of acid derivatives that may be mentioned include Nacure® 3327 or Nacure® 3525 (dinonylnaphthalenedisulfonic acid masked with an amine, containing 25% active material in isopropanol and isobutanol) sold by King Industries, Nacure® 1557 or Nacure® 1953 (dinonylnaphthalenesulfonic acid masked with an amine, containing 25% active material in a mixture of butanol and 2-butoxyethanol) sold by King Industries, Nacure® 5225 or Nacure® 5528 or Nacure® 5925 (dodecylbenzenesulfonic acid masked with an amine, containing 25% active material in isopropanol) sold by King Industries, Nacure® 2107 or Nacure® 2500 (para-toluenesulfonic acid masked with an amine, containing 25% or 26% active material in isopropanol) sold by King Industries, Nacure® 2501 or Nacure® 2530 (para-toluenesulfonic acid masked with an amine, containing 25% active material in a mixture of isopropanol and methanol) sold by King Industries, Nacure® 4167 (dialkyl phosphate masked with an organic amine, containing 25% active material in a mixture of isopropanol and isobutanol) sold by King Industries, Nacure® 4575 (phosphate acid blocked with an amine, containing 25% active material in a mixture of methanol and butanol) sold by King Industries.

Preferably, the catalyst is chosen from the group consisting of organometallic compounds (in particular aluminum-based coordination complexes), orthophosphoric acid, organophosphate acids (preferably C1-C22 mono- or dialkyl phosphate acid and mixtures thereof), ammonium salts (in particular of sulfonic acid or of organophosphate acid), and mixtures thereof. Even more preferably, the catalyst is chosen from the group consisting of orthophosphoric acid, organophosphate acids (preferably C1-C22 mono- or dialkyl phosphate acid and mixtures thereof), ammonium salts (in particular of sulfonic acid or of organophosphate acid).

The mass content of catalyst in composition B ranges from 0.01% to 95%, preferably from 1% to 90%, preferentially from 5% to 90%, more preferentially from 10% to 80%, even more preferentially from 10% to 70%, advantageously from 20% to 60%, in particular from 20% to 50% by weight, relative to the total weight of composition B.

In the context of the invention, and unless otherwise mentioned, the mass content of catalyst is the solids content (referred to as active material).

The content of catalyst in composition B may be, for example, one of the following contents: 0.01%, 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 81%, 62%, 63%, 64%, 65%, 66%, 67%, 68%, 69%, 70%, 71%, 72%, 73%, 74%, 75%, 76%, 77%, 78%, 79% or 80%.

Preferably, when the catalyst is chosen from organometallic compounds, the content of catalyst in composition B ranges from 20% to 90%, preferably from 30% to 60%, advantageously from 45% to 55% by weight relative to the total weight of composition B.

Preferably, when the catalyst is chosen from acids, and especially inorganic acids, the content of catalyst in composition B ranges from 2% to 60%, preferably from 5% to 50%, in particular from 5% to 30%, advantageously from 5% to 20% by weight relative to the total weight of composition B.

Preferably, when the catalyst is chosen from acid derivatives, and especially ammonium salts of sulfonic acids or ammonium salts of organophosphate acids, the content of catalyst in composition B ranges from 5% to 60%, preferably from 10% to 50%, advantageously from 15% to 40%, in particular from 20% to 30% by weight relative to the total weight of composition B.

2. Compound C

The abovementioned composition B comprises at least one compound C chosen from:
- a compound C1 with a number-average molecular mass ranging from 300 g/mol to 50000 g/mol; and
- a compound C2 with a vapor pressure at 20° C. of greater than or equal to 0.08 kPa;
- and mixtures thereof.

According to one embodiment, composition B comprises:
- a compound C1;
- a mixture of different compounds C1;
- a compound C2;
- a mixture of different compounds C2; or
- a mixture of at least one compound C1 and of at least one compound C2.

Compound C1 preferably exhibits a number-average molecular mass ranging from 1000 g/mol to 50000 g/mol, preferably from 1000 g/mol to 20000 g/mol, in particular from 2000 g/mol to 20000 g/mol, preferentially from 3000 g/mol to 20000 g/mol, for example from 4000 g/mol to 18000 g/mol, advantageously from 5000 g/mol to 10000 g/mol, and especially from 7000 g/mol to 9000 g/mol.

The number-average molecular mass of compound C1 may be measured by methods that are well known to those skilled in the art, for example by size exclusion chromatography using polystyrene standards.

Compound C1 preferably has a viscosity at 23° C. ranging from 10 mPa·s to 100 000 mPa·s, in particular from 500 to 50000 mPa·s, preferably from 500 to 20000 mPa·s, preferentially from 500 to 15000 mPa·s, advantageously from 500 to 10000 mPa·s, for example from 1000 to 5000 mPa·s, preferably from 1000 to 3000 mPa·s.

According to the invention, compound C1 may be chosen from the group consisting of polyols, tackifying resins, organosilanes, mono- or disilyl polymers, polyol esters, polyetheramines, and mixtures thereof.

Preferably, compound C1 may be chosen from the group consisting of polyols, tackifying resins, organosilanes, mono- or disilyl polymers, polyol esters, and mixtures thereof.

Preferably, compound C1 may be chosen from the group consisting of polyols, tackifying resins, organosilanes, mono- or polysilyl polymers, polyol esters, and mixtures thereof.

According to the invention, compound C1 may be a reactive or non-reactive compound. The term "reactive" means that it comprises at least one function which can react with the alkoxysilane function(s) of the silyl polymer of composition A, during their mixing. For example, the polyols, the tackifying resins, the polyol esters are non-reactive compounds. For example, the organosilanes and the mono- or disilyl polymers are reactive compounds.

The use of the reactive compound C1 advantageously makes it possible to lead to adhesive compositions after mixing which have better heat resistance.

According to one embodiment, compound C1 is a polyol chosen from the group consisting of polyether polyols, polyester polyols, polytetrahydrofuran polyols, polyacrylate polyols, polycarbonate polyols, polyether carbonate polyols, polyester carbonate polyols, polyacetal polyols, poly(esteramide) polyols, polythio ether polyols, polyolefin polyols, and mixtures thereof, compound C1 preferably being chosen from polyether polyols, polyester polyols and mixtures thereof.

In the context of the invention, the term "polyol" means any linear or branched, cyclic or acyclic, saturated or unsaturated, aromatic or aliphatic, hydrocarbon-based compound comprising at least two hydroxyl (OH) functions. The polyol may be optionally substituted with a functional group, and/or may comprise one or more divalent groups chosen from ether (—O—), and carboxyl (—C(=O)O— or —OC(=O)—) groups.

The polyols may be chosen from diols, triols, and mixtures thereof.

According to one embodiment, compound C1 is a polyol chosen from the group consisting of polyols with an $I_{OH}$ ranging from 5 to 500 mg KOH/g, preferably from 5 to 250 mg KOH/g, preferentially from 6 to 50 mg KOH/g, in particular from 10 to 28 mg KOH/g.

The hydroxyl number $I_{OH}$ of a polyol represents the number of hydroxyl functions per gram of polyol, and is expressed in the form of the equivalent number of milligrams of potassium hydroxide (KOH) used in the assay of the hydroxyl functions, determined experimentally by titrimetry according to the standard ISO 14900:2001. In the case of a mixture of polyols, the $I_{OH}$ may also be calculated from the known $I_{OH}$ values of each of the polyols and from their respective weight contents in said mixture.

The polyacetal polyols may be, for example, those prepared by reaction between a glycol (for instance diethylene glycol) with formaldehyde. Polyacetals may also be prepared by polymerization of cyclic acetals.

The polyolefin polyols may be butadiene homopolymers and copolymers comprising hydroxyl end groups.

The polycarbonate polyols may be those obtained by reaction between at least one diol comprising from 2 to 10 carbon atoms (for instance 1,3-propanediol, 1,4-butanediol, 1,6-hexanediol, diethylene glycol or tetraethylene glycol) with at least one diaryl carbonate comprising from 3 to 20 carbon atoms, for instance diphenyl carbonate, or with phosgene.

The polyester polyols may be:
- polyester polyols of natural origin, such as castor oil;
- polyester diols derived from a polymerization with ring opening of at least one lactone ring (preferably comprising from 3 to 7 carbon atoms) with at least diol, such as polycaprolactone polyols;
- polyester polyols resulting from the condensation of:
  - at least one dicarboxylic acid or at least one of the corresponding anhydrides or diesters thereof; and
  - at least one diol.

The dicarboxylic acid(s) that may be used for the synthesis of the abovementioned polyester polyols preferably comprise from 3 to 40 carbon atoms, and preferentially from 6 to 10 carbon atoms.

Preferably, the dicarboxylic acid(s) that may be used for the synthesis of the abovementioned polyester polyols are chosen from the group consisting of malonic acid, succinic acid, fumaric acid, glutaric acid, adipic acid, 1,3- or 1,4- cyclohexanedicarboxylic acid, 3-methyl-1,5-pentanedicarboxylic acid, 1,10-decanedicarboxylic acid, 1,12-dodecanedicarboxylic acid, 1,18-octadecanedicarboxylic acid, methyltetrahydrophthalic acid, hexahydrophthalic acid, tetrahydrophthalic acid, azelaic acid, sebacic acid, and mixtures thereof.

The diol(s) that may be used for the synthesis of the abovementioned polyester polyols may be chosen from polyalkylene diols, polyoxyalkylene diols, and mixtures thereof, the alkylene (saturated) part of these compounds preferably being linear or branched and preferably comprises from 2 to 40 carbon atoms and more preferentially from 2 to 8 carbon atoms.

Preferably, the diol(s) that may be used for the synthesis of the abovementioned polyester polyols are chosen from the group consisting of ethylene glycol, diethylene glycol, triethylene glycol, neopentyl glycol, 1,6-hexanediol, butanediol, propylene glycol, dipropylene glycol, tetraethylene glycol, tripropylene glycol, 3-methyl-1,5-pentanediol, 2,2-dimethyl-1,3-propanediol, and mixtures thereof.

Among the polyester polyols, examples that may be mentioned include the following products with hydroxyl functionality equal to 2:

Tone® 0240 (available from Union Carbide), which is a caprolactone with a number-average molecular mass of about 2000 Da, an $I_{OH}$ equal to 56, and with a melting point of about 50° C.;

Dynacoll® 7381 (available from Evonik), the number-average molecular mass of which is about 3500 Da, of $I_{OH}$ equal to 30, and with a melting point of about 65° C.;

Dynacoll® 7360 (available from Evonik) resulting from the condensation of adipic acid, the number-average molecular mass of which is about 3500 Da, of $I_{OH}$ equal to 30, and with a melting point of about 55° C.;

Dynacoll® 7330 (available from Evonik), the number-average molecular mass of which is about 3500 Da, of $I_{OH}$ equal to 30, and with a melting point of about 85° C.;

Dynacoll® 7363 (available from Evonik) resulting from the condensation of adipic acid with hexanediol, the number-average molecular mass of which is about 5500 Da, of $I_{OH}$ equal to 21, and with a melting point of about 57° C.

In the context of the invention, the term "hydroxyl functionality of a polyester polyol" means the mean number of hydroxyl functions per mole of polyester polyol.

The polyester polyols may be amorphous or crystalline, preferably amorphous.

Preferably, the polyester polyols are those obtained by condensation reaction between adipic acid and a mixture of neopentyl glycol, ethylene glycol and 1,6-hexanediol; or between adipic acid and 3-methyl-1,5-pentanediol.

The polyether polyols may be oxyalkyl derivatives of diols (for instance ethylene glycol, propylene glycol, neopentyl glycol), of triols (for instance glycerol, trimethylolpropane, hexane-1,2,6-triol), or of tetraols (for instance pentaerythritol). The polyether polyols may be obtained by polymerization of the corresponding alkylene oxide in the presence of a catalyst.

Preferably, the polyether polyols are polypropylene glycols (or PPG), in particular having a hydroxyl functionality equal to 2 or 3, and preferably a polydispersity index ranging from 1 to 1.6, preferably from 1 to 1.4.

In the context of the invention, the term "polydispersity index" means the ratio between the weight-average molecular mass and the number-average molecular mass, determined especially by GC.

Among the polypropylene glycols with a hydroxyl functionality equal to 2, mention may be made of:

Voranol® EP 1900: difunctional PPG with a number-average molecular mass of about 4008 g/mol, and a hydroxyl number $I_{OH}$ equal to 28 mg KOH/g;

Acclaim® 8200: difunctional PPG with a number-average molecular mass of about 8016 g/mol, and a hydroxyl number $I_{OH}$ equal to 14 mg KOH/g;

Acclaim® 12200: difunctional PPG with a number-average molecular mass of about 11222 g/mol, and a hydroxyl number $I_{OH}$ equal to 10 mg KOH/g;

Acclaim® 18200: difunctional PPG with a number-average molecular mass of about 17265 g/mol, and a hydroxyl number $I_{OH}$ equal to 6.5 mg KOH/g.

Among the polypropylene glycols with a hydroxyl functionality equal to 3, mention may be made of:

Voranol® CP 755: trifunctional PPG with a number-average molecular mass of about 710 g/mol, and a hydroxyl number $I_{OH}$ equal to 237 mg KOH/g;

Voranol® CP 3355: trifunctional PPG with a number-average molecular mass of about 3544 g/mol, and a hydroxyl number $I_{OH}$ equal to 47.5 mg KOH/g;

Acclaim® 6300: trifunctional PPG with a number-average molecular mass of about 5948 g/mol, and a hydroxyl number $I_{OH}$ equal to 28.3 mg KOH/g.

In the context of the invention, the term "hydroxyl functionality of a polyether polyol" means the mean number of hydroxyl functions per mole of polyether polyol.

According to a preferred embodiment, the polyether polyols have a functionality equal to 2 and a number-average molecular mass preferably ranging from 3000 to 20000 g/mol, preferentially from 4000 to 19000 g/mol, in particular from 5000 to 15000 g/mol, and advantageously from 7000 to 13000 g/mol.

According to a preferred embodiment, the polyether polyols have a functionality equal to 3 and a number-average molecular mass preferably ranging from 500 to 20000 g/mol, preferentially from 500 to 10000 g/mol, in particular from 500 to 5000 g/mol, and advantageously from 500 to 4000 g/mol.

According to a preferred embodiment, the polyether polyols have a hydroxyl number $I_{OH}$ ranging from 5 to 500 mg KOH/g, preferably from 6 to 200 mg KOH/g, preferentially from 6 to 100 mg KOH/g, in particular from 6 to 50 mg KOH/g, advantageously from 6 to 40 mg KOH/g, and for example from 6 mg KOH/g to 20 mg KOH/g.

According to one embodiment, compound C1 is chosen from organosilanes, in particular chosen from the group consisting of aminosilanes, mercaptosilanes, glycidoxysilanes, vinylsilanes, epoxy silanes, (meth)acrylate silanes, glycoxysilanes, anhydro silanes, and mixtures thereof.

In the context of the invention, the term "organosilane" means a compound comprising an organic group bonded to the Si atom by means of an Si—C bond.

Preferably, the organosilanes comprise at least one, preferably at least two or even three alkoxy groups connected to the Si atom by means of Si—O bonds.

The organosilanes may be monomers or oligomers.

Among the organosilanes, examples that may be mentioned include 3-aminopropylmethyldimethoxysilane, 3-aminopropyltrim ethoxysilane (for example available under the name Silquest® A1110 from the company Momentive), 3-glycidoxypropyltrimethoxysilane (for example available under the name Silquest® A-187 from the company Momentive), 3-mercaptopropyltrimethoxysilane (for example available under the name Silquest® A-189 from the company Momentive), mercaptopropyltriethoxysilane, mercaptopropylmethyldimethoxysilane, mercaptopropylmethyldiethoxysilane, mercaptomethyltrimethoxysilane, mercaptomethyltriethoxysilane, N-aminoethyl-3-aminopropyltrimethoxysilane, 3-methacryloxypropyltrimethoxysilane (for example available under the name Silquest® A-174NT from the company Momentive), tris(3-trimethoxysilylpropyl) isocyanurate (for example available under the name Silquest® Y-11597 from the company Momentive), bis(3-triethoxysilylpropyl) polysulfide (for example available under the name Silquest®A-1289 from the company Momentive), bis(3-triethoxysilyl) disulfide (for example available under the name Silquest®A-1589 from the company Momentive), beta-(3,4-epoxycyclohexyl)ethyltrimethoxysilane (for example available under the name Silquest® A-186 from the company Momentive), bis(triethoxysilyl)ethane (for example available under the name Silquest® Y-9805 from the company Momentive), gamma-isocyanatopropyltrimethoxysilane (for example available under the name Silquest® A-Link 35 from the company Momentive), (methacryloxymethyl)tri(m)ethoxysilane (for example available under the names Geniosil® XL 33, or Geniosil® XL 36 from the company Wacker), (methacryloxymethyl)(m)ethyldimethoxysilane (for example available under the names Geniosil® XL 32, or Geniosil® XL34 from the company Wacker), (isocyanatomethyl)methyldimethoxysilane (for example available under the name Geniosil® XL 42 from the company Wacker), (isocyanatomethyl)trimethoxysilane (for example available under the name Geniosil® XL 43 from the company Wacker), (methacryloxymethyl)methyldiethoxysilane, 2-acryloxyethylmethyldimethoxysilane, 2-methacryloxyethyltrimethoxysilane, 3-acryloxypropylmethyldimethoxysilane, 2-acryloxyethyltrimethoxysilane, 2-methacryloxyethyltriethoxysilane, 3-acryloxypropyltrimethoxysilane, 3-acryloxypropyltripropoxysilane, 3-methacryloxypropyltriethoxysilane, 3-methacryloxypropyltriacetoxysilane, 3-methacryloxypropylmethyldimethoxysilane, glycoxysilane derived from the reaction between 2-methyl-1,3-propanediol and vinyltrimethoxysilane, and mixtures thereof.

According to one embodiment, compound C1 is chosen from tackifying resins in particular having a number-average molecular mass ranging from 100 g/mol to 6000 g/mol, preferably from 300 g/mol to 4000 g/mol.

The tackifying resin may be, for example, any abovementioned tackifying resin for composition A of the invention.

In particular, the tackifying resin is a resin of the type (iii) mentioned previously, especially rosin esters. Mention may be made, for example, of Silvalite® RE 100 (ester of rosin and of pentaerythritol, with a number-average molecular mass of about 1700 Da, Tg=48° C.) sold by Arizona Chemical, or Sylvatac® RE 12 (liquid rosin ester, Tg=−24° C.) sold by Arizona Chemical.

According to one embodiment, compound C1 is chosen from polyol esters. The polyol esters may be prepared, for example, by esterification reaction of polyol, for example of tetrol, for instance of pentaerythritol.

An example of a polyol ester that may be mentioned is pentaerythrityl tetravalerate.

According to one embodiment, compound C1 is chosen from monosilyl polymers, disilyl polymers and mixtures thereof.

The disilyl polymers may be any of those mentioned previously for the abovementioned composition A, in particular the polymers of the abovementioned formulae (II), (III), (IV) or (V).

Preferably, the monosilyl polymers comprise a group of the abovementioned formula (I).

Preferably, the monosilyl polymers correspond to one of the following formulae, or to a mixture thereof:

formula (IX):

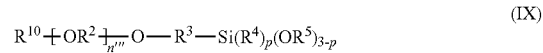

in which:
- $R^{10}$ represents a divalent hydrocarbon-based radical comprising from 1 to 60 carbon atoms, which may be aromatic or aliphatic, linear, branched or cyclic,
- $R^3$ represents a linear or branched divalent alkylene radical comprising from 1 to 6 carbon atoms,
- $R'^2$ represents a linear or branched divalent alkylene radical comprising from 2 to 4 carbon atoms,
- $R^4$ and $R^5$, which may be identical or different, each represent a linear or branched alkyl radical comprising from 1 to 4 carbon atoms, $R^4$ possibly being engaged in a ring; preferably, $R^4$ is a methyl group,
- n''' is a zero or nonzero integer such that the number-average molecular mass of the polyether block of formula $—[OR'^2]_n—$ ranges from 0 g/mol to 20000 g/mol,
- p is an integer equal to 0, 1 or 2,
- $R^{10}$ and n''' are such that the number-average molecular mass of the monosilyl polymer is at least 1000 g/mol;

formula (X):

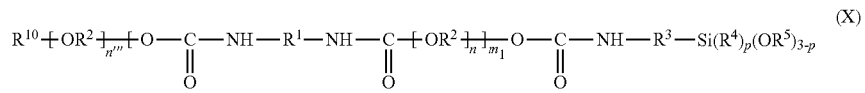

in which:
- $R^{10}$ represents a divalent hydrocarbon-based radical comprising from 1 to 60 carbon atoms, which may be aromatic, aliphatic or aromatic alkyl, linear, branched or cyclic,
- $R^1$ represents a divalent hydrocarbon-based radical comprising from 5 to 15 carbon atoms, which may be aromatic or aliphatic, linear, branched or cyclic,
- $R^3$ represents a linear or branched divalent alkylene radical comprising from 1 to 6 carbon atoms,
- $R^2$ and $R'^2$, which may be identical or different, each represent a linear or branched divalent alkylene radical comprising from 2 to 4 carbon atoms,
- $R^4$ and $R^5$, which may be identical or different, each represent a linear or branched alkyl radical comprising from 1 to 4 carbon atoms, $R^4$ possibly being engaged in a ring; preferably, $R^4$ is a methyl group, n is an integer such that the number-average molecular mass of the polyether block of formula —[OR$^2$]$_n$— ranges from 300 g/mol to 40000 g/mol, n''' is a zero or nonzero integer such that the number-average molecular mass of the polyether block of formula —[OR'$^2$]$_n$— ranges from 0 to 20000 g/mol, m$_1$ is a zero or nonzero integer, p is an integer equal to 0, 1 or 2, R$^{10}$ and the indices m$_1$, n and n''' are such that the number-average molecular mass of the monosilyl polymer is at least 1000 g/mol.

Preferably, in formulae (IX) and (X) above, p is an integer equal to 0 or 1. More preferentially, p is equal to 1.

Preferably, the monosilyl polymers have a number-average molecular mass Mn ranging from 1000 to 55000 g/mol, preferably from 2000 to 45000 g/mol, more preferentially from 3000 to 35000 g/mol.

Among the monosilyl polymers of formula (IX), examples that may be mentioned include:

SAT®145 sold by Kaneka: monosilyl polymer comprising a main chain of polyether type and a hydrolyzable-methyldimethoxysilane end group. It corresponds in particular to a polymer of formula (IX) in which R$^3$ is a propylene group and p=1;

SAX® 015 sold by Kaneka: monosilyl polymer comprising a main chain of polyether type and a hydrolyzable-trimethoxysilane end group. It corresponds in particular to a polymer of formula (IX) in which R$^3$ is a propylene group and p=0;

Among the monosilyl polymers of formula (X), examples that may be mentioned include:

Geniosil® XM20 sold by Wacker: monosilyl polymer with a number-average molecular mass of about 6000 g/mol. It comprises a main chain of polyether type and a hydrolyzable methylene-methyldimethoxysilane end group. It corresponds in particular to a polymer of formula (X) in which m$_1$=0 and p=1;

Geniosil® XM25 sold by Wacker: monosilyl polymer with a number-average molecular mass of about 6000 g/mol. It comprises a main chain of polyether type and a hydrolyzable propylene-methyldimethoxysilane end group. It corresponds in particular to a polymer of formula (X) in which m$_1$=0 and p=0.

In the context of the invention, and unless otherwise mentioned, the term "polyetheramines" means compounds comprising a polyether main chain, and at least one amine function (or even at least two amine functions).

According to one embodiment, compound C1 is chosen from polyetheramines.

Among the polyetheramines, mention may be made in particular of the Jeffamines sold by the company Huntsman, for instance the polyetherdiamine of formula: H$_2$N—CH$_2$—CH$_2$—O—CH$_2$—CH$_2$—O—CH$_2$—CH$_2$—NH$_2$ having a primary alkalinity of 13.49 meq/g (available, for example, under the trade name Jeffamine® ED 148 from the company Huntsman).

Compound C2 preferably has a vapor pressure at 20° C. of greater than or equal to 0.08 kPa, preferentially between 0.08 kPa and 13 kPa, even more preferentially between 0.08 kPa and 8 kPa, in particular between 0.1 kPa and 5 kPa.

Preferably, compound C2 has a boiling point of less than or equal to 171° C. at atmospheric pressure, preferably less than or equal to 110° C., advantageously less than or equal to 85° C., in particular less than or equal to 79° C.

Compound C2 is chosen from alcohols, for example from isopropanol, isobutanol, butanol, methanol, 2-butoxyethanol, and mixtures thereof.

Advantageously, compound C2 is evaporated during the application of the adhesive composition to a support layer.

According to a preferred embodiment, when the catalyst is an acid derivative as described above, compound C is a compound C2.

According to a preferred embodiment, when the catalyst is not an acid derivative as described above, compound C is a compound C1.

Preferably, when the catalyst is an inorganic acid, for instance orthophosphoric acid, compound C is not chosen from polyols.

According to one embodiment, the catalyst(s): compound(s) C ratio in composition B ranges from 0.01:99.99 to 95:5, preferably from 5:95 to 95:5, in particular from 5:95 to 60:40, preferentially from 10:90 to 50:50, advantageously from 20:80 to 50:50.

The content of compound(s) C in composition B may range from 5% to 99.99%, preferably from 10% to 99%, for example from 10% to 95%, preferentially from 20% to 90%, even more preferentially from 30% to 80%, advantageously from 40% to 70% by weight, relative to the total weight of composition B.

The presence of the compound(s) C allows dilution of the catalyst in composition B, and thus advantageously allows an increase in the flash point of said composition B. This has the effect especially of advantageously improving the safety of the process for preparing a self-adhesive article.

In addition, the presence of the compound(s) C, in particular in contents of greater than or equal to 50% by weight of composition B, advantageously makes it possible to reduce the risks of toxicity, during the use, for example, of an organometallic catalyst.

Moreover, the presence of said compound(s) C in composition B advantageously allows better dispersion of the catalyst(s) in the adhesive composition (obtained after mixing compositions A and B). This better dispersion advantageously leads to coating with a uniform adhesive layer which does not present any problem of formation of grains and/or gels that impair the optical quality of the final coatings, or which hinder the defect-free application of the coating onto the surfaces to be bonded.

Furthermore, the presence of the compound(s) C in composition B advantageously makes it possible to add very small amounts of catalyst.

The compound(s) C are advantageously inert with respect to the catalyst, i.e. they do not react with the catalyst.

3. Additives

Composition B may comprise water. The water may originate from the compounds of composition B, and/or may be added to composition B.

The water content in composition B may range from 0.05% to 50% by mass, preferably from 0.1% to 30% by mass, preferentially from 0.5% to 15% by mass, advantageously from 0.5% to 10% by mass, in particular from 0.5% to 5% by mass relative to the total mass of composition B.

According to one embodiment, composition B comprises water, in particular when compound C comprises at least one compound C1 which is not an organosilane or a mono-or disilyl polymer.

According to one embodiment, composition B comprises water, in particular when compound C is a compound C2.

According to one embodiment, the composition B is free of water. The term "free of water" means a water content of less than or equal to 200 ppm, preferably less than or equal to 100 ppm, for example less than or equal to 50 ppm, or even less than or equal to 20 ppm. Preferably, composition B is free of water, when compound C comprises at least one compound C1 chosen from organosilanes, mono- or disilyl polymers, and mixtures thereof.

The water content may be measured, for example by Karl Fisher assay according to the standard ISO 760.

The water contained in composition B may be in liquid or gaseous form, or encapsulated, or absorbed, or contained in the chemical structure of a component which can subsequently render it free and available.

The water may be derived from one or more components of said composition B.

Composition B may comprise at least one additive, such as those mentioned previously for composition A. In particular, composition B may contain an additive which will participate in curing other than that involving the silane functions, in the presence or absence of another component of composition A.

Composition B may comprise at least one filler, preferably in a content of less than or equal to 15%, preferably less than or equal to 10% by weight relative to the total weight of composition B.

Preferably, composition B does not comprise any filler.

Composition B may contain a compound chosen from $NH_4F$, $Bu_4NF$, $HF$, $BF_3$, $Et_2NSF_3$, $HSO_3F$, a polymer of the type such as polyether polyol PPG comprising at least one fluoro group, a compound bearing at least one Si—F bond, and mixtures thereof.

4. Composition B

According to one embodiment, composition B has a viscosity at 23° C. which ranges from 3 mPa·s to 50000 mPa·s, preferably from 600 mPa·s to 25000 mPa·s, preferentially from 800 mPa·s to 16 000 mPa·s, advantageously from 1000 mPa·s to 5000 mPa·s, for example from 1100 mPa·s to 2000 mPa·s, in particular from 1200 mPa·s to 1500 mPa·s.

According to one embodiment, composition B has a viscosity at a temperature ranging from 40° C. to 160° C., preferably from 60° C. to 100° C., which ranges from 50 mPa·s to 500000 mPa·s, preferably from 600 mPa·s to 100000 mPa·s, preferentially from 1200 mPa·s to 50000 mPa·s, advantageously from 1200 mPa·s to 10000 mPa·s, for example from 1200 mPa·s to 5000 mPa·s.

The constituents of composition B are preferably chosen such that composition B is advantageously stable over time. Preferably, composition B is such that the ratio $(V_{final} - V_{initial})/V_{initial}$ is less than or equal to 30%, preferably less than or equal to 20%, preferentially less than or equal to 10%, with:
  $V_{final}$ being the viscosity of composition B after heating at 40° C. for 28 days, measured at 23° C.;
  $V_{initial}$ being the viscosity of composition B before said heating, measured at 23° C.

The catalyst is advantageously chosen so as to be soluble in the abovementioned compound(s) C, advantageously to form a composition B which is homogeneous, especially on storage at 23° C. or after heating at 40° C. for 28 days. The term "homogeneous" means that there is no phase separation (flocculation or sedimentation) between the catalyst(s) and the compound(s) C in composition B.

Multicomponent Adhesive Composition

The multicomponent, preferably two-component, adhesive composition may comprise one or more additional compositions in addition to compositions A and B, said additional composition(s) possibly comprising compound(s) of any type. For example, the multicomponent adhesive composition may comprise an additional composition D comprising at least one tackifying resin, chosen, for example, from those described above for compositions A and B. The multicomponent composition according to the invention may also comprise a composition D comprising water. The water may be in liquid or gaseous form, or encapsulated, or absorbed, or contained in the chemical structure of a component. The water may be derived from one or more components which may subsequently render it free and available.

According to one embodiment, the adhesive composition according to the invention is a two-component composition consisting of the abovementioned compositions A and B.

The catalyst in the multicomponent adhesive composition is the catalyst derived from composition B.

The total content of catalyst in the multicomponent, and preferably two-component, adhesive composition according to the invention may be chosen from one of the following contents: 0.01%, 0.02%, 0.03%, 0.04%, 0.05%, 0.06%, 0.07%, 0.08%, 0.09%, 0.1%, 0.2%, 0.3%, 0.4%, 0.5%, 0.6%, 0.7%, 0.8%, 0.9%, 1%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 4.0%, 4.1%, 4.2%, 4.3%, 4.4%, 4.5%, 4.6%, 4.7%, 4.8%, 4.9%, 5%, 5.1%, 5.2%, 5.3%, 5.4%, 5.5%, 5.6%, 5.7%, 5.8%, 5.9%, 6%, 6.1%, 6.2%, 6.3%, 6.4%, 6.5%, 6.6%, 6.7%, 6.8%, 6.9%, 7%, 7.1%, 7.2%, 7.3%, 7.4%, 7.5%, 7.6%, 7.7%, 7.8%, 7.9%, 8%, 8.1%, 8.2%, 8.3%, 8.4%, 8.5%, 8.6%, 8.7%, 8.8%, 8.9%, 9%, 9.1%, 9.2%, 9.3%, 9.4%, 9.5%, 9.6%, 9.7%, 9.8%, 9.9%, or 10% by weight relative to the total weight of the multi-component adhesive composition.

The total content of catalyst in the multicomponent, and preferably two-component, adhesive composition according to the invention may range from 0.01% to 10%, preferably from 0.01% to 5%, preferentially from 0.05% to 4%, advantageously from 0.1% to 3%, in particular from 0.5% to 2% by weight, relative to the total weight of said two-component adhesive composition.

The multicomponent, preferably two-component, adhesive composition according to the invention may comprise at least one cocatalyst (other than the catalyst derived from composition B).

According to one embodiment, when the catalyst is chosen from acids and derivatives thereof, its total content in the multicomponent, preferably two-component, adhesive composition is less than or equal to 1%, preferably less than or equal to 0.5%, advantageously less than or equal to 0.2%, preferentially less than or equal to 0.1%, or even less than or equal to 0.05%, relative to the total weight of said composition.

Preferably, in the multicomponent, preferably abovementioned two-component, adhesive composition, the composition A:composition B mass ratio ranges from 99.95:0.05 to 90:10, preferably from 99.95:0.05 to 95:5, preferentially from 99.5:0.5 to 95:5, advantageously from 99:1 to 95:5.

The composition A:composition B ratio according to the invention may be chosen from one of the following ratios: 99.95:0.05, 99.5:0.5, 99:1, 98:2, 97:3, 96:4 or 95:5.

According to a preferred embodiment, the multicomponent, preferably two-component, adhesive composition is a hot-melt pressure-sensitive composition, also known as a hot-melt pressure-sensitive adhesive (or HMPSA).

Typically, hot-melt pressure-sensitive adhesive compositions are solid compositions or compositions of high viscosity (pasty) at room temperature, which are deposited (or coated) onto a support in liquid form, and give said support after cooling immediate bonding power (or tack) at room temperature, which advantageously allows its instantaneous adhesion to a substrate under the effect of a light and brief pressure.

HMPSAs are especially distinguished from hot-melt adhesives, or HM adhesives, which are compositions which give the support that is coated therewith a relatively hard nature, and lacking in "tack" at room temperature.

The multicomponent, preferably two-component, adhesive composition according to the invention is advantageously hot-curable and/or moisture-curable.

According to a preferred embodiment, the multicomponent, preferably two-component, adhesive composition according to the invention comprises:
a composition A comprising:
at least one silyl polymer, preferably of formula (II), (III), (IV) or (V), advantageously a polymer of formula (III), in particular a polymer of formula (III) in which $m_1$ is equal to 0, $R^4$ and $R^5$ represent a methyl group, p is equal to 1 and $R^3$ represents a methylene; and
at least one tackifying resin, preferably chosen from resins obtained by polymerization of terpene hydrocarbons and phenols, in the presence of Friedel-Crafts catalyst(s);
a composition B comprising:
at least one compound C1 chosen from the group consisting of polyetheramines, polyols and mixtures thereof; in particular, compound C1 is chosen from polyether polyols, for instance polypropylene glycols in particular having a hydroxyl functionality equal to 2 or 3, and preferably a polydispersity index ranging from 1 to 1.6, preferably from 1 to 1.4; and
a catalyst chosen from organometallic compounds, in particular based on aluminum, for instance aluminum chelates;
optionally water, preferably in a content of less than 10% by weight, for example less than 1% by weight, relative to the total weight of composition B;
the composition A:composition B ratio preferably ranging from 99:1 to 95:5, preferentially from 99:1 to 98:2 and
the total content of catalyst preferably ranging from 0.5% to 5%; preferably, the total content of catalyst is 1%, 2% or 3% by weight relative to the total weight of said adhesive composition, said adhesive composition preferably being a hot-melt pressure-sensitive adhesive composition. Preferably, in this embodiment, the content of compound(s) C1 ranges from 30% to 75%, preferably from 40% to 70% by weight relative to the total weight of composition B, and the content of catalyst ranges from 25% to 70%, preferably from 30% to 60% by weight relative to the total weight of composition B.

According to one embodiment, the multicomponent, preferably two-component, adhesive composition according to the invention comprises:
a composition A comprising:
at least one silyl polymer, preferably of formula (II), (III), (IV) or (V), advantageously a polymer of formula (III), in particular a polymer of formula (III) in which $m_1$ is equal to 0, $R^4$ and $R^5$ represent a methyl group, p is equal to 1 and $R^3$ represents a methylene; and
at least one tackifying resin, preferably chosen from resins obtained by polymerization of terpene hydrocarbons and phenols, in the presence of Friedel-Crafts catalyst(s);
a composition B comprising:
at least one compound C1 chosen from mono- or disilyl polymers and/or mixtures thereof, in particular the monosilyl polymers of the abovementioned formula (X), in which, preferably, $m_1$=0, $R^3$ is a methylene group and p=1; and
a catalyst chosen from organometallic compounds, in particular based on aluminum, for instance aluminum chelates;
the composition A:composition B ratio preferably ranging from 99:1 to 95:5, preferentially from 99:1 to 98:2 and
the total content of catalyst preferably ranging from 0.5% to 5%; preferably, the total content of catalyst is 1%, 2% or 3% by weight relative to the total weight of said adhesive composition, said adhesive composition preferably being a hot-melt pressure-sensitive adhesive composition. Preferably, in this embodiment, the content of compound(s) C1 ranges from 30% to 75%, preferably from 40% to 70% by weight relative to the total weight of composition B, and the content of catalyst ranges from 25% to 70%, preferably from 30% to 60% by weight relative to the total weight of composition B.

According to one embodiment, the multicomponent, preferably two-component, adhesive composition according to the invention comprises:
a composition A comprising:
at least one silyl polymer, preferably of formula (II), (III), (IV) or (V), advantageously a polymer of formula (III), in particular a polymer of formula (III) in which $m_1$ is equal to 0, $R^4$ and $R^5$ represent a methyl group, p is equal to 1 and $R^3$ represents a methylene; and
at least one tackifying resin, preferably chosen from resins obtained by polymerization of terpene hydrocarbons and phenols, in the presence of Friedel-Crafts catalyst(s);
a composition B comprising:
at least one compound C1 chosen from tackifying resins, preferably chosen from rosins of natural origin or modified rosins; and
a catalyst chosen from acids, in particular inorganic acids, for instance orthophosphoric acid,
the composition A:composition B ratio preferably ranging from 99.5:0.5 to 98:2 and the total content of catalyst preferably being less than or equal to 1%, preferentially less than or equal to 0.5%, advantageously less than or equal to 0.2%, for example less than or equal to 0.1% relative to the total weight of said adhesive composition,
said adhesive composition preferably being a hot-melt pressure-sensitive adhesive composition. Preferably, in this embodiment, the content of compound(s) C1 ranges from 50% to 95%, preferably from 70% to 95% by weight relative to the total weight of composition B, and the content of catalyst ranges from 5% to 50%, preferably from 5% to 30% by weight relative to the total weight of composition B.

According to one embodiment, the multicomponent, preferably two-component, adhesive composition according to the invention comprises:
a composition A comprising:
at least one silyl polymer, preferably of formula (II), (III), (IV) or (V), advantageously a polymer of formula (III), in particular a polymer of formula (III) in which $m_1$ is equal to 0, $R^4$ and $R^5$ represent a methyl group, p is equal to 1 and $R^3$ represents a methylene; and at least one tackifying resin, preferably chosen from resins obtained by polymerization of terpene hydrocarbons and phenols, in the presence of Friedel-Crafts catalyst(s);
a composition B comprising:
at least one compound C1 chosen from polyols, in particular chosen from polyether polyols, for instance polypropylene glycols in particular having a hydroxyl functionality equal to 2 or 3, preferably 3; and
a catalyst chosen from acids, in particular organophosphate acids,
optionally water, preferably in a content of less than 10% by weight, for example less than 2% by weight, relative to the total weight of composition B;
the composition A:composition B ratio preferably ranging from 99.5:0.5 to 98:2 and the total content of catalyst preferably being less than or equal to 1%, preferentially less than or equal to 0.5%, advantageously less than or equal to 0.2% by weight, with respect to the total weight of said adhesive composition,
said adhesive composition preferably being a hot-melt pressure-sensitive adhesive composition. Preferably, in this embodiment, the content of compound(s) C1 ranges from 40% to 90%, preferably from 50% to 80% by weight relative to the total weight of composition B, and the content of catalyst ranges from 10% to 60%, preferably from 20% to 50% by weight relative to the total weight of composition B.

According to one embodiment, the multicomponent, preferably two-component, adhesive composition according to the invention comprises:
a composition A comprising:
at least one silyl polymer, preferably of formula (II), (III), (IV) or (V), advantageously a polymer of formula (III), in particular a polymer of formula (III) in which $m_1$ is equal to 0, $R^4$ and $R^5$ represent a methyl group, p is equal to 1 and $R^3$ represents a methylene; and
at least one tackifying resin, preferably chosen from resins obtained by polymerization of terpene hydrocarbons and phenols, in the presence of Friedel-Crafts catalyst(s);
a composition B comprising:
at least one compound C2 chosen, for example, from alcohols;
a catalyst chosen from acid derivatives, in particular from ammonium salts of acids, for example ammonium salts of sulfonic acids or ammonium salts of organophosphate acids;
optionally water, preferably in a content of less than 40% by weight, and preferably greater than 2% by weight, relative to the total weight of composition B;
the composition A:composition B ratio preferably ranging from 99.98:0.02 to 98:2 and the total content of catalyst preferably being less than or equal to 2%, preferentially less than or equal to 1%, advantageously less than or equal to 0.5% by weight, with respect to the total weight of said adhesive composition,
said adhesive composition preferably being a hot-melt pressure-sensitive adhesive composition. Preferably, in this embodiment, the content of compound(s) C2 ranges from 40% to 90%, preferably from 50% to 80% by weight relative to the total weight of composition B, and the content of catalyst ranges from 10% to 50%, preferably from 15% to 40% by weight relative to the total weight of composition B.

The multicomponent, preferably two-component, adhesive composition, before curing, may be solid at 23° C., or may have a viscosity at 23° C. of greater than or equal to 100 000 mPa·s.

The multicomponent, preferably two-component, adhesive composition, before curing, may have a viscosity at 100° C. of less than or equal to 50000 mPa·s, preferably less than or equal to 20000 mPa·s.

The adhesive composition according to the invention advantageously leads to high curing rates. These high curing rates advantageously make it possible to avoid treatment in an oven, or to reduce the residence time in the curing oven at the temperature and/or humidity during the preparation of self-adhesive articles, and thus to reach a short residence time in the oven, namely, for example, less than 5 minutes, preferably less than 1 minute, preferentially less than 30 seconds, and advantageously less than 10 seconds. The adhesive composition according to the invention thus advantageously leads to high industrial production rates.

The adhesive composition according to the invention advantageously has good self-adhesive properties after curing.

Compositions A and B of said adhesive composition (before mixing) are stable on storage, at elevated temperature and/or at elevated moisture content. The greater stability over time advantageously allows longer storage and handling with a reduced risk of reaction, degradation or curing of compositions A and B, between their production and their hot application.

The adhesive composition according to the invention advantageously allows the formation of a uniform adhesive layer which does not have any problem of uncontrolled and non-homogeneous formation of grains or gels, and/or advantageously allows uniform curing over the entire support layer.

The adhesive composition may advantageously comprise a high content of catalyst, without giving rise to setting to a solid in the tubes in which the components of the adhesive circulate during the production of self-adhesive articles.

Preferably, the adhesive composition according to the invention is packaged in a kit comprising at least two separate compartments, namely a first compartment for composition A and a second compartment for composition B, and optionally other compartments for additional compositions.

Kit

The present invention also relates to a kit comprising at least the abovementioned composition A and composition B in two separate compartments. The compartments may, for example, be drums, cartridges, bags, etc. When the multicomponent adhesive composition comprises other compositions, they are contained in other compartments of the kit.

Self-Adhesive Article

A subject of the present invention is also a self-adhesive article comprising a support layer coated with a self-adhesive layer, said self-adhesive layer consisting of an adhesive composition according to the invention in cured form.

For the purposes of the present invention, the term "self-adhesive article" includes any article which may be bonded onto a surface only by the action of pressure with the hand or an item of equipment, without the use of additional bonding agents or adhesives.

The self-adhesive article is a pressure-sensitive self-adhesive article.

These articles especially have the aim of being applied to a surface to be bonded so as to bring together, maintain, fix, or simply immobilize, expose forms, logos, images or information. These articles may be used in many fields, such as the medical field, clothing, packaging, motor vehicles (for example for attaching logos, lettering, interior soundproofing, interior fitting, bonding in the driving compartment) or construction (for example for phonic and thermal insulation, the assembling of windows). They may be fashioned as a function of their final application, for example in the form of tapes, such as tapes for industrial use, tapes for do-it-yourself work or for fixing use on worksites, single-sided or double-sided tapes, or in the form of labels, bandages, dressings, patches or graphic films.

According to one embodiment, the self-adhesive article is a self-adhesive multilayer system, and in particular a self-adhesive label or tape, which may be single-sided or double-sided.

The material that may be used for the support layer may be, for example, any type of rigid or flexible support. Examples that may be mentioned include supports of the type such as foams, felts, nonwoven support, plastics, membranes, papers or a film of a polymer material with one or more layers.

The support layer is made of a material chosen, for example, from polyolefins, such as polyethylene, including high-density polyethylene, low-density polyethylene, linear low-density polyethylene and linear ultra-low-density polyethylene; polypropylene and polybutylenes; polystyrene; natural or synthetic rubber; vinyl copolymers, such as polyvinyl chloride, which may or may not be plasticized, and poly(vinyl acetate); olefinic copolymers, such as ethylene/methacrylate copolymers, ethylene/vinyl acetate copolymers, acrylonitrile/butadiene/styrene copolymers, and ethylene/propylene copolymers; acrylic polymers and copolymers; polyurethanes; polyethers; polyesters; and mixtures thereof. Preferably, the support layer is based on acrylic polymers, polyethylene (PE), polypropylene (PP), which may be oriented, non-oriented or bioriented, polyimide, polyurethane, polyester such as polyethylene terephthalate (PET), or paper.

According to one embodiment, the self-adhesive article obtained from the adhesive composition according to the invention comprises a permanent support layer coated with an adhesive layer. Preferably, the adhesive layer is also coated with a nonstick, preferably silicone-treated protective plastic or paper film.

As an alternative to the nonstick protective film, the rear face of the permanent support layer which is not coated with the adhesive layer may have a nonstick surface, for example a silicone-treated protective layer.

According to one embodiment, the permanent support layer is coated on both faces with an adhesive composition, which may be identical or different, at least one of the two adhesive compositions being according to the invention.

Preferably, the support layer has a thickness ranging from 10 microns to 50 mm, more preferably ranging from 10 microns to 20 mm, preferably ranging from 20 microns to 10 mm, more preferably ranging from 20 microns to 1 mm.

In certain specific cases, it is necessary to perform a surface treatment on the support layer to increase the attachment of the adhesive layer during the step of coating thereon.

The self-adhesive article according to the invention can thus bond two substrates. The substrate onto which the self-adhesive article is intended to be applied (referred to as the "substrate to be bonded") may be flexible or rigid. In particular, it may have the same flexibility properties as the support layer described above, so as to be rolled up and packaged in the form of a reel, for example as described previously. Alternatively, the substrate to be bonded may be rigid. In this case, the substrate cannot be rolled up and packaged in the form of a reel, for example as described previously. The substrate to be bonded may be chosen, for example, from concrete, paper, substrates of polyolefin type, etc.

According to one embodiment, the self-adhesive article also comprises a protective nonstick layer (release liner).

According to one embodiment, said nonstick layer is applied to the adhesive layer, after curing of the adhesive composition.

The support layer may be covered on one of its two faces, the rear face which is not coated with the adhesive layer, with a protective nonstick layer, for example with a silicone film. In this way, the self-adhesive article can be wound around itself and then unwound without any problem by virtue of the absence of adhesion of the adhesive layer to the silicone-treated face.

The self-adhesive article according to the invention is able to be obtained via the process comprising the following steps:
  (a) mixing of compositions A and B of the adhesive composition according to the invention as defined previously at a temperature ranging from 40° C. to 130° C.; and then
  (b) coating, with the adhesive composition obtained in step (a), of a bearing surface; and then
  (c) curing of the coated adhesive composition, by heating to a temperature ranging from 50° C. to 200° C. in particular in a gaseous environment in which water molecules are present at between 10 and 200 g per m$^3$ of gas;
  (d) laminating or transfer of the cured adhesive layer onto a support layer or onto a nonstick protective film, said support layer or nonstick film possibly being the reverse side of the bearing surface.

For the purposes of the present invention, the term "bearing surface" should be understood as meaning either a belt conveyor coated with a nonstick layer, or a nonstick protective film ("release liner"), or a support layer. Thus, the bearing surface is made to become an integral part of the self-adhesive article, either as nonstick protective film, or as support layer.

In the case where the bearing surface is not a support layer, the process for obtaining the self-adhesive article according to the invention comprises step (d) of transferring the cured adhesive layer onto a support layer.

In the case where the bearing surface is a support layer, the process for obtaining the self-adhesive article according to the invention may comprise step (d) of laminating of the adhesive layer onto a nonstick protective film.

According to a preferred variant of the invention, step (d) of the process described above consists in transferring the cured adhesive layer onto a flexible support layer (which may be a plastic film) after cooling of the cured adhesive layer to a temperature below the degradation temperature or softening point of the material of which the support layer is composed.

According to one embodiment, the self-adhesive article according to the invention may be obtained via the process as described previously, not comprising a step of pretreatment of the surface of the support layer. These pretreatments are directed toward chemically and/or physically modifying said surface, to increase the surface energy and/or the roughness of said surface, and thus to improve the adhesion of the adhesive layer to said surface. By way of example of known surface treatments, mention may be made of a plasma, corona treatment, abrasion or application to said surface of a chemical attachment agent (also known as a primer) which is capable of giving the substrate coated with said agent a high surface energy.

According to one embodiment, the process for manufacturing the self-adhesive article according to the invention also comprises a step (e) of coating a second layer of adhesive composition according to the invention onto the support layer followed by a step (f) of curing the adhesive composition coated in step (e) by heating to a temperature ranging from 20 to 200° C. According to this embodiment, a double-sided self-adhesive article is obtained.

The coating step (b) may be performed by means of known coating devices, for instance a lip nozzle or a nozzle of curtain type, or else with a roller. It uses a weight per unit area of adhesive composition ranging from 3 to 5000 g/m$^2$.

The weight per unit area of adhesive composition required for the manufacture of self-adhesive labels may range from 10 to 100 g/m$^2$, preferably from 20 to 50 g/m$^2$. The adhesive composition required for the manufacture of self-adhesive tapes may vary within a much wider range extending from 3 to 5000 g/m$^2$, preferably from 15 to 250 g/m$^2$ per face.

According to one embodiment, the coated adhesive composition (P) is also subjected, during step (c), to a treatment in a humid atmosphere characterized by its humidity level. Preferably, the humid atmosphere is an atmosphere in which from 2% to 100% of the molecules are water molecules, preferably from 3% to 50%, more preferably from 3% to 10%, of the molecules are water molecules.

The humidity level is expressed as the percentage of water per unit volume, which corresponds to the number of water molecules divided by the total number of molecules in a unit of volume. By virtue of the linear nature of this scale, the humidity level is easily measured and monitored by using, for example, monitors of P.I.D (Proportional-Integral-Derivative) type. The weight percentage may be calculated by multiplying the percentage of the number of water molecules relative to the total number of molecules by a factor of 0.622. General information regarding the humidity level in various environments is described by W. Wagner et al. in *International Steam Tables—Properties of Water and Steam based on the Industrial Formulation IAPWS-IF97*.

The thermal curing step has the effect especially of creating—between the hydrolyzable polymer chains bearing alkoxysilane ends of the adhesive composition and under the action of atmospheric moisture—bonds of siloxane type which lead to the formation of a three-dimensional polymer network. The adhesive composition thus cured is in particular a pressure-sensitive adhesive which gives the support layer which is coated therewith the desired adhesive power and tack.

Preferably, the coating is performed uniformly over the support layer or over the nonstick protective layer, but the coating can also be adapted to the desired shape of the final self-adhesive article.

According to one embodiment, coating with the adhesive composition is performed over at least a portion of the two faces of the support layer. If the two faces of the support layer are coated, the adhesive composition can be identical or different on the two faces and the weight per unit area can be identical or different on the two faces.

According to one embodiment of the invention, the self-adhesive article comprises an adhesive layer over at least a portion of one face or over at least a portion of the two faces of the support layer, said adhesive layer(s) being optionally coated with a nonstick protective layer. According to one embodiment, the self-adhesive article comprises two nonstick protective layers on each of the two adhesive layers. In this case, the two protective layers can be made of identical or different materials and/or they can have an identical or different thickness.

The self-adhesive article according to the invention may be used in an adhesive bonding method comprising the following steps:

a) removing the nonstick protective layer, when such a layer is present;

b) applying the self-adhesive article to one surface of a product; and c) applying a pressure to said article.

In step b), the self-adhesive article is applied so that the self-adhesive part of the article (formed by the self-adhesive layer) is facing the surface of the product.

According to an embodiment in which the self-adhesive article is a double-sided article, the bonding method also comprises a step in which either a second surface of a product is applied to the article bonded to the first surface of a product, or the article bonded to the first surface of a product is applied to a second surface of a product.

Application Process

The present invention also relates to a process for the hot application of the multicomponent, preferably two-component, adhesive composition (80), as defined previously, to a support (96), by means of an installation (20) for the hot application of said adhesive composition, the installation comprising:

a nozzle (50) for applying the multicomponent adhesive composition;

a line (88*a*) for feeding composition A of the multicomponent adhesive composition to be applied in fluid form;

a line (66*a*) for feeding composition B of the multicomponent adhesive composition to be applied in fluid form;

a line (88) for feeding the nozzle (50) with the multicomponent adhesive composition to be applied in fluid form;

a mixer (30) for mixing at least compositions A and B of the multicomponent adhesive composition;

the process comprising:

supplying the feed line (88*a*) with at least composition A of the multicomponent adhesive composition;

supplying the feed line (66*a*) with at least composition B of the multicomponent adhesive composition;

mixing at least composition A and composition B of the multicomponent composition using a mixer (30);

hot application of the mixed multicomponent adhesive composition (80) onto a support with the aid of the application nozzle (50).

The installation according to the invention may comprise other feed line(s), especially other line(s) for feeding the mixer (30) with other additional composition(s) of the multicomponent composition. For example, if the adhesive composition according to the invention is a three-component composition, the installation may comprise a line (95) for feeding especially the mixer (30) with an additional composition D (in addition to the abovementioned compositions A and B).

The mixer may be a static mixer or a dynamic mixer.

Preferably, the static or dynamic mixer must be able to be temperature-regulated. Preferably, the mixer is a dynamic mixer, advantageously allowing mixing at high shear, and the obtention of better homogeneity of the adhesive composition resulting from the mixing of at least compositions A and B of the multicomponent composition.

The mixer (30) may be arranged between the lines for feeding at least composition A (88*a*) and composition B (66*a*), and the feed line (88), and may allow homogeneous mixing of the compositions constituting the multicomponent adhesive composition.

The process according to the invention comprises the mixing of at least composition A and composition B of the multicomponent composition using a mixer (30). The mixing step may be a mixing of composition A with composition B, and optionally with one or more additional compositions of the multicomponent composition.

The installation may comprise an in-line heating device (22), upstream of the point of mixing of at least composition A with composition B, and including a static mixer (30) and an inductive cable (26) surrounding the static mixer.

The application process may comprise, prior to the hot application, the heating of at least compositions A and B up to the application temperature, via the electrical supply of an inductive cable (26) of the in-line heating device (22).

The installation may comprise heating means (44) suitable for being placed in a storage reservoir (82) comprising composition A or composition B or another additional composition of the multicomponent composition, to raise said composition to a pumping temperature; preferably, at least composition A is raised to a pumping temperature of between 50° C. and 140° C., preferably between 80° C. and 120° C., preferentially between 90° C. and 110° C.

Preferably, the multicomponent adhesive composition is applied (after mixing at least compositions A and B) at a temperature of between 50° C. and 140° C., preferably between 80° C. and 120° C., more preferentially between 90° C. and 110° C.

FIG. 1 shows a schematic representation of one embodiment of the installation 20.

Figure 1:
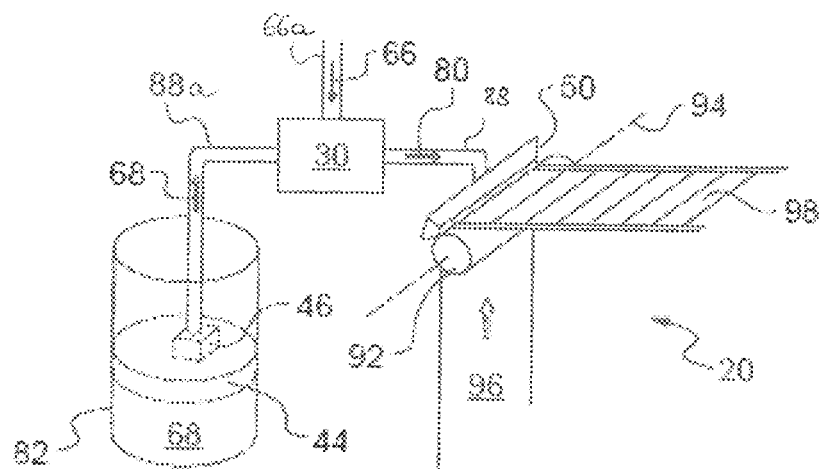
FIG. 1 shows one embodiment of an installation suitable for performing the proposed process for the application of adhesive composition according to the invention.

According to one embodiment, as a result of the at least double supply, composition B (66) is separated from composition A (68) up to a mixer (30) placed between the lines for feeding at least compositions A (88*a*) and B (66*a*) and the line (88) for feeding the multicomponent adhesive composition to be applied. In other words, the mixer (30) is in-line and allows a step of homogeneous mixing of compositions (66) and (68) supplied separately to be performed. The injection of composition B (66) into composition A (68) is performed in the mixer (30), as illustrated, for example, in FIG. 1, to allow immediate mixing of these compositions.

The various compositions constituting the multicomponent adhesive composition according to the invention may be totally separated, i.e. each composition is supplied separately to the hot application installation (20). In particular, the injection of composition A (68), of composition B (66) and of optional additional composition(s) of the multicomponent adhesive composition is performed in the mixer (30).

The installation according to the invention may comprise several mixers (not shown in the figures). The installation may comprise, for example, at least one mixer upstream of the mixer (30), or downstream of the mixer (30), preferably upstream.

According to one embodiment, the installation according to the invention comprises at least two mixers, which are preferably in-line, a first mixer (M) for mixing at least compositions A (68) and B (66) supplied separately to said mixer (M), and at least one mixer (30) allowing mixing, for example, between the mixture obtained in the mixer (M) with at least one additional composition (for example denoted D) of the multicomponent composition, before its application. In this case, the installation also comprises a line for feeding the additional composition (for example D) to the mixer (30). The injection of composition D into the mixture of composition A and of composition B prepared in the upstream mixer (M) is performed, in this case, in the mixer (30).

According to another embodiment, the installation according to the invention comprises at least two mixers, which are preferably in-line, a first mixer (M) for mixing at least composition A (68) with at least one other additional composition (for example denoted D) of the multicomponent composition, which are supplied separately, and at least one mixer (30) allowing mixing, for example, between the mixture obtained at the outlet of the first mixer (M) with at least composition B, before its application. In this case, the installation also comprises a line for feeding the additional composition (for example denoted D) to the mixer (M). The injection of at least composition B into the mixture of composition A and of at least composition D prepared in the upstream mixer (M) is performed, in this case, in the mixer (30). Such an embodiment may also correspond to the premixing of composition B (66) (instead of composition A) with at least one other additional composition in the mixer (M), followed by mixing of the mixture obtained in the mixer (M) with composition A (instead of composition B).

Irrespective of the embodiment, the constituents of composition A may be mixed one by one, or altogether, or by mixing several constituents with other constituent(s). This is likewise the case for composition B, and for optional additional composition(s) of the multicomponent adhesive composition. Thus, the installation may provide for additional mixers upstream of the feed lines (88*a*), (66*a*), and of the lines for feeding the additional composition(s).

In the installation according to the invention, composition A (68) may be heated in the storage reservoir (82) by means of a heating means (44), without bringing about curing of composition A (68) due to the separation of composition B (66), comprising at least the curing catalyst. Heating in the storage reservoir (82), represented in the form of a drum, in particular makes it possible to reduce the viscosity of composition A (68), to facilitate the pumping in the installation (20), such as with the aid of a pump (46), before any contact with the separate composition B (66).

This heating means (44) (preferably being a hotplate) contributes especially toward establishing composition A (68) at the application temperature. The application temperature especially corresponds to a temperature at which the adhesive composition to be applied has a viscosity that is low enough to allow the application, in other words the coating, of the mixed multicomponent adhesive composition (80) onto the surface (96). Specifically, after mixing compositions B (66) and A (68), the multicomponent adhesive composition (80) is constituted and may be applied hot to the support (96) with the aid of an application nozzle (50). A temperature for application of the multicomponent adhesive composition (80) may thus correspond to a temperature at which the viscosity of the multicomponent adhesive composition is less than or equal to 50 Pa·s, preferably less than or equal to 10 Pa·s. By way of example, the multicomponent adhesive composition (80) may have a viscosity of 5±1 Pa·s at an application temperature ranging from 60° C. to 120° C. Following the application of the multicomponent adhesive composition (80) to the surface (96), the coated support (98) is subjected to a controlled temperature, and optionally to a controlled degree of humidity, to allow the curing of the multicomponent adhesive composition. The controlled temperature may be obtained with the aid of an oven or a chamber. The controlled temperature corresponds to a temperature of curing of the multicomponent adhesive composition (80) and is, for example, between 50° C. and 200° C., preferably between 80° C. and 160° C., in particular between 100° C. and 150° C.

Similarly, composition B (66) may also be heated before it is mixed with composition A (68) without any risk of curing before they are mixed. This is likewise the case for any composition of the multicomponent composition according to the invention.

The heating of all of the separate compositions B (66) and A (68) before mixing them makes it possible especially to bring these components to the application temperature without any risk of curing before they are mixed in the mixer (30).

By allowing a reduction of the hot residence time of the multicomponent adhesive composition (80), the proposed process can perform the establishment of the application temperature of the multicomponent adhesive composition (80), even in the case where the application temperature is within the temperature range for the curing of the multicomponent adhesive composition (80). Depending on the intended application temperature which is within the curing temperature range, the hot residence time of the multicomponent adhesive composition (80) in motion may then be adapted. The hot residence time of the multicomponent adhesive composition in motion may especially be modified with the flow rate of the multicomponent adhesive composition (80) and the volume of the feed line (88) from the point of mixing of the separate compositions B (66), A (68) and the application nozzle (50). For example, for a multicomponent adhesive composition (80) to be applied at 100° C. and having a curing temperature range from 100° C. to 120° C. with curing times from one to a few minutes (in the case without additional supply of moisture in the oven since water is already present in composition B), the flow rate of the in line multicomponent adhesive composition (80) may be adjusted so that the curing reaction remains limited so as not to foul the installation with cured adhesive composition.

According to one embodiment, the supplying of composition B may also be modified during the desired or undesired stopping of the adhesive article production line.

The progress of the curing reaction may be assessed with reference to the degree of conversion of the curing reaction in the installation determined according to the following equation:

$$X = \frac{\dot{m}_0 - \dot{m}_t}{\dot{m}_0} \quad (1)$$

in which X is the unitless degree of conversion, $\dot{rh}_0$ is the mass flow rate of uncured multicomponent adhesive composition in the storage reservoir (82) in drum form; $\dot{rh}_t$ is the mass flow rate of uncured adhesive composition in the nozzle (50).

The flow rate of the in line multicomponent adhesive composition (80) may thus be adjusted so that, depending on the reaction kinetics and the temperature, the degree of conversion of the adhesive composition curing reaction allows the coating of a homogeneous adhesive layer. The flow rate of the adhesive composition (80) in the in line heating device is, for example, between 80 g·min$^{-1}$ and 1500 g·min$^{-1}$, i.e. from about 4.8 to 90 kg per hour, equal to 120 g·min$^{-1}$, i.e. about 7 kg per hour. This flow rate depends especially on the length of the curing oven, the thickness of the adhesive layer and the coating width.

Figure 2:
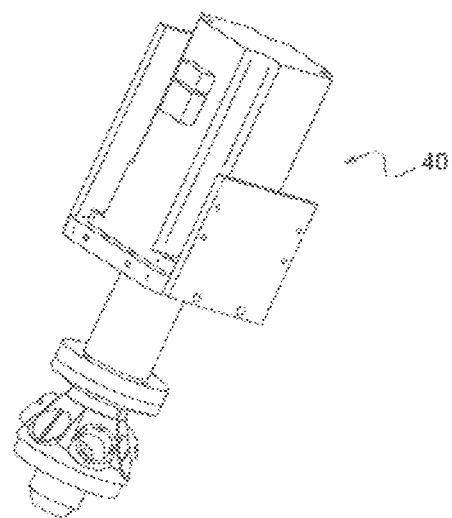
FIG. 2 shows one embodiment of the dynamic mixer used in the proposed process.
Figure 3:
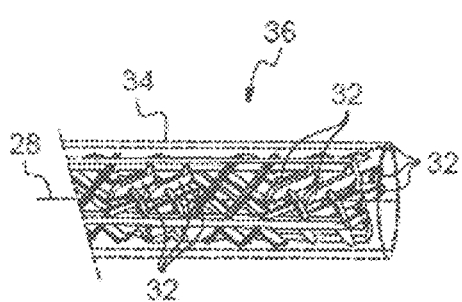
FIG. 3 shows one embodiment of the static mixer used in the proposed process.
Figure 4:
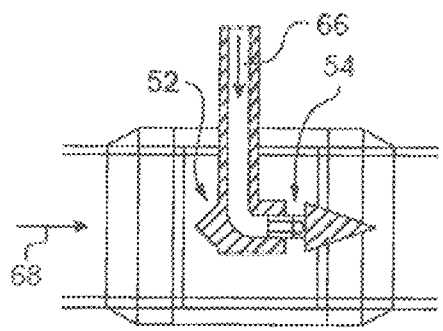
FIG. 4 shows a cross-section-reducing adapter at the point of mixing of the components.

To allow mixing of the components with a high flow rate, the mixer (30) and optionally the mixer(s) (M) may be suited to a very efficient mixer and the use of several feed and mixing systems for feeding the coating system. The mixer (30) may be a dynamic mixer (40) as illustrated in FIG. 2. Alternatively, FIG. 3 shows a perspective view of the internal structure of one embodiment of the mixer (30) as a static mixer (36). Static mixers are especially known to be used in the injection molding industry in order to homogenize the material before injection in a mold. The static mixer (36) in the line (88) may comprise at least one mixing element having fluid deflection surfaces (32) directed toward obtaining a homogeneous mixture of the fluid over a short distance and with low shear. The mixing elements may have a surface density of greater than or equal to 5×10$^3$ m$^{-1}$, preferably between 5×10$^3$ m$^{-1}$ and 10*10$^3$ m$^{-1}$. The surface density corresponds to a quantity of deflection surfaces per volume and is thus expressed in m$^2$/m$^3$, i.e. in m$^{-1}$. The static mixer (36) may also be provided with an adapter (52) at the point of injection of composition B (66) into the line (88), as illustrated in FIG. 4. This adapter (52) which reduces the cross section for free passage (54) for composition B (66) then locally increases its flow rate during its mixing with composition A (68), making it pass successively from a laminar regime to an intermediate or turbulent regime on passing through the adapter, facilitating the dispersion of composition B (66) in composition A (68), and then to a laminar regime. Specifically, at the point of contact, or point of mixing, the curing catalyst is locally at a high concentration greatly increasing the kinetics of reaction with composition A (68). The local increase in the rate of throughput then makes it possible to limit the contact time, at the point of injection, between composition B (66) and composition A (68) before they are mixed more homogeneously, and thus less reactive locally.

As illustrated in dashed lines in FIG. 3, the static mixer presents all of the mixing elements as comprising deflection surfaces (32) arranged in a sheath (34). The sheath (34) forms a pipe for the circulation of the adhesive composition (80). Since the mixer (36) is arranged in line, the sheath (34), as a circulation pipe of the mixer (36), is a portion of the line (88).

The static mixer (36) may have the particular feature of including an electrically conductive material. In this document, the term "electrically conductive material" means a material which has a resistivity of less than 10 Ω·m, preferably less than 10$^{-6}$ Ω·m. This particular feature allows the addition of an inductive heating function to the mixer (36). This addition of a heating function to the mixer (36) may also be performed when the mixer is a dynamic mixer. However, since compositions B (66) and A (68) can be heated to the application temperature without any risk of curing, the addition of the heating function particularly has the advantage of maintaining the application temperature in the mixer (36).

Figure 5:
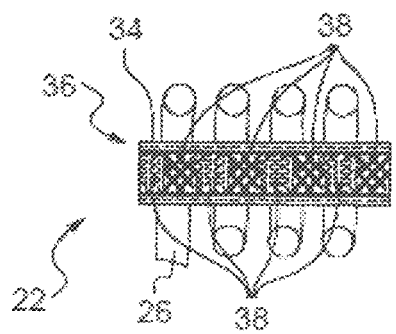
FIG. 5 shows a heating device comprising the static mixer of FIG. 3.

With reference to FIG. 5, the mixer (36) in static mixer form may be partly included in a line heating device (22), this device (22) comprising an inductive cable surrounding the static mixer. The line heating device is preferably arranged upstream of the point of mixing of compositions B (66) and A (68), a static mixer part (36) being arranged downstream of the point of mixing. The magnetic field generated by the inductive cable (26) surrounding the static mixer (36) is then capable of inducing an electric current, which is known as a Foucault current, in the electrical conductor of the static mixer (36). The Foucault currents induced in the electrical conductor give rise to a release of heat via the Joule effect, which diffuses to the multicomponent adhesive composition (80) via the components of the static mixer (36). The inductive cable (26) is fed, for example, with a high-frequency electric current, preferably greater than or equal to 1 MHz, such as 15 MHz.

According to a preferred embodiment of the line heating device (22), the sheath (34) is made of electrically insulating material. In this document, the term "electrically insulating material" means a material which has a resistivity of greater than or equal to $10^6$ $\Omega \cdot m$. The insulating material of the sheath (34) is, for example, glass or a prepolymer free of conductive fillers. According to this preferred embodiment, the mixing elements 38 are made of electrically conductive material to allow inductive heating of the static mixer (36). Specifically, as indicated previously, the inductive cable (26) is capable, with an alternating current electrical supply, of inducing a Foucault current in any electrical conductor placed in the magnetic field produced. The induction of Foucault currents is then performed directly in the mixing elements (38) on the deflection surfaces (32), and not in the sheath 34 placed between the inductive cable and the mixing elements (38). The production of induction and of a Joule effect on the deflection surfaces (32) allows more efficient heating of the adhesive composition (80) which comes into direct contact with these deflection surfaces (32), without an intermediary.

According to a less advantageous embodiment, the sheath (34) is made of conductive material, so that the induction of a Foucault current only penetrates the sheath (34) and not the mixing elements (38). The Joule effect then takes place in the sheath (34), and the heat diffuses to the multicomponent adhesive composition (80) by conduction via the deflection surfaces (32). In this less advantageous proposed embodiment, the heat exchanging is less efficient due to the use of an intermediary to conduct the heat.

According to a preferred embodiment of the proposed process (20), the application nozzle (50) may also be heated. Heating of the nozzle (50) then contributes toward establishing the application temperature of the adhesive composition (80). Thus, according to this embodiment, the application nozzle (50) forms part of the device (22) for heating to the application temperature. Heating of the nozzle (50) makes it possible to supply thermal energy at the end of the line (88) to bring the adhesive composition to the final application temperature. Since this final application temperature is not reached until the end of the line (88), the residence time at this temperature is short, thus limiting the risks of curing of the adhesive composition. According to this embodiment, the compositions B (66) and A (68) may be heated to a slightly lower temperature, for example 10° C. or less, than the final application temperature. Since the temperature of the multicomponent adhesive composition (80) in the static mixer (30) is lower than the application temperature, the curing time at this temperature is shorter and the risks of clogging in line are then further reduced.

All the embodiments described above may be combined with each other. In particular, the various abovementioned constituents of the composition, and especially the preferred embodiments, of the composition may be combined with each other.

In the context of the invention, the term "between x and y" or "ranging from x to y" means a range in which the limits x and y are included. For example, the range "between 0% and 25%" especially includes the values 0% and 25%.

The following examples are given purely by way of illustration of the invention and should not be interpreted as limiting the scope thereof.

EXAMPLES

Ingredients Used:
Acclaim® 8200, available from Covestro: polypropylene glycol diol with a number-average molecular mass of 8016 g/mol and a hydroxyl number IOH of 14 mgKOH/g;
Geniosil® STP-E30, available from Wacker: polypropylene glycol capped with an alpha silane function of methyl dimethoxy type with a number-average molecular mass of about 14 493 g/mol;
Geniosil® XL-33, available from Wacker: methacryloxymethyltrimethoxysilane
Sylvatac RE-12, available from Kraton: rosin ester which is liquid at room temperature, with an acid number of 12 mgKOH/g and a glass transition temperature of −25° C.;
Mesamoll, available from Lanxess: phenyl alkyl sulfonic ester, plasticizer;
K-KAT® 5218, available from the company King Industries: catalyst of aluminum chelate type;
orthophosphoric acid: available from Febex, purity of 99%;
Dertophene® H150, available from DRT: tackifying resin of terpene phenolic type;
Irganox® 1010, available from BASF: antioxidant of hindered phenol type;
Irganox® 245, available from BASF: antioxidant of hindered phenol type;
Irganox® B561, available from BASF: mixture of antioxidant of hindered phenol type and of hindered phosphite type.
Polymer P1 is Geniosil® STP-E30, available from Wacker.

Example 1

Preparation of the Adhesive Compositions

Example 1a

Preparation of Composition A

Composition A of the adhesive composition was prepared by first introducing the tackifying resin Dertophene® H150 into a glass reactor under vacuum and heated to approximately 160° C. Then, once the resin was fully melted, the polymer composition, the antioxidant (and other optional compounds) were added. Once the mixture is homogeneous, the reactor is no longer heated and is maintained with moderate volumic stirring until the mixture has cooled to a temperature of about 80° C. The reactor was then emptied and the adhesive composition was stored for a week in an aluminum cartridge to preserve it from atmospheric moisture and to prevent any undesired curing.

Table of composition A:

|  | A1 |
| --- | --- |
| Dertophene H150 | 46.1% |
| Irganox 1010 | 0.8% |
| Irganox B561 | 1.5% |
| Irganox 245 | 0.2% |
| Polymer P1 | 51.0% |
| Geniosil XL33 | 0.4% |

The percentages are mass percentages relative to the total mass of composition A.

Example 1b

Preparation of the Compositions B

Compositions B (B1, B2) of the adhesive composition were prepared by first introducing the compound(s) C (as defined previously) into a glass reactor under nitrogen and at 23° C. Next, the catalyst(s) was (were) added under nitrogen. These compositions B may be stored in a polyethylene or polypropylene drum or bag, or in an aluminum triplex bag heat-sealed under nitrogen.

Table of compositions B:

|  | B1 | B2 |
| --- | --- | --- |
| K-KAT 5218 (catalyst) | 50 |  |
| Acclaim 8200 | 50 |  |
| Orthophosphoric acid (99%) (catalyst) |  | 5 |
| Sylvatac RE12 |  | 75 |
| Mesamoll |  | 20 |

The percentages are mass percentages relative to the total mass of composition B.

Example 1c

Preparation of the Adhesive Compositions

The adhesive compositions E1 and E2 were prepared by mixing parts A and B detailed in the table below.
Part A is preheated for 1 hour at 80° C. and then placed in a polypropylene bowl, and part B which is at room temperature is finally added. The polypropylene bowl is placed in a laboratory speed-mixer under the following stirring conditions: 2000 rpm for 5 minutes. 5 g of the amount of the resulting mixture are taken to immediately perform the test described in example 2a. Simultaneously, the rest of the mixture is taken to perform the operation described in example 2b within three minutes of the end of mixing.

|  | Composition E1 (invention) | Composition E2 (invention) |
| --- | --- | --- |
| Composition B | B1 | B2 |
| Total content of catalyst in the final adhesive composition (mass %) | 1% | 0.1% |
| Ratio A:B | 98:2 | 98:2 |

Example 1d

Preparation of the Comparative Adhesive Compositions F (F1 and F2)

Comparative compositions F1 and F2 were prepared by mixing the various ingredients, as described in example 1a. Once prepared, compositions F1 and F2 were stored for one week. The compositions are described in the following table.

Table of compositions F:

|  | F1 | F2 |
| --- | --- | --- |
| Dertophene H150 | 45.4% | 45.2% |
| Irganox 1010 | 0.8% | 0.8% |
| Irganox B561 | 1.5% | 1.5% |
| Irganox 245 | 0.2% | 0.2% |
| Polymer P1 | 50.2% | 50.0% |
| Geniosil XL33 | 0.4% | 0.4% |
| Acclaim 8200 | 1% | 1% |
| K-KAT 5218 | 0.5% | 1% |

The percentages are mass percentages relative to the total mass of composition F (F1 or F2).

These adhesive compositions F1 and F2 are one-component compositions. They comprise the same ingredients as composition E1 according to the invention.

Example 2

Tests

Example 2a

Method for Measuring the Curing Time (Skinning Time)

For each of the compositions, the time for formation of a skin at the surface of a film at 100° C. in a chamber air-conditioned at 23° C. and 50%±5% relative humidity was measured according to the following method:
A first approximate measurement of the skinning time was made. For this:
Preheating of a hotplate at 100° C. (±5° C.) for at least 30 minutes before the start of the test.
Weighing of a sample, at room temperature, of 5 g of the test composition in an aluminum crucible.
Checking that the surface temperature of the plate is at 100° C. (with an IR gun).
Placing of the crucible containing the sample described above on the hotplate at 100° C.
Starting of the chronometer.
Every 30 seconds, a metal point was superficially driven into the surface of the sample. A very thin string which stretches greatly is formed when the skinning time (ST) (which corresponds to the start of formation of a skin at the surface) approaches; the string transforms into a small tube which very rapidly breaks. It is considered that the skin is formed when the metal point is moved from left to right without breaking this tube adhesively bonded to the point. In a second stage, three additional measurements are taken in order to refine the measurement of the skinning time obtained by the first estimation. To do this, for each of the additional measurements, the process was performed as previously: preparation of a new 5 g sample from the same composition as described in example 1, placing of the crucible containing the sample on a hotplate at 100° C., and then starting of the chronometer. 30 seconds before the skinning time found during the first test, the surface of the sample was checked every 5 seconds as previously until the exact skinning time of the sample was determined.

The mean skinning time of the sample expressed in minutes or seconds:

Skinning time±3×σ where σ represents the standard deviation (which corresponds to a confidence interval of 99.9%).

The results are given in table 1 below.

Example 2b

Preparation of a PET Support Layer Coated with the Cured Adhesive Composition, at a Weight Per Unit Area of 50 g/m²

A polyethylene terephthalate (PET) rectangular sheet 50 µm thick and with dimensions of 20 cm×40 cm is used as support layer. The final mixture of the adhesive (example 1d and 1c) is deposited at a temperature of between 80 and 100° C. In the case of the adhesive composition F1, a cartridge obtained in example 1d is preheated to a temperature of close to 100° C., and from which a bead is extruded which is deposited close to the edge of the sheet parallel to its width. In the case of the adhesive compositions E1 and E2, the bead is deposited immediately after the mixing performed in example 1c. The bead is subsequently spread over the entire of the surface of the sheet, so as to obtain a uniform layer of substantially constant thickness. A film spreader (also known as a filmograph) is used to do this, and is moved at a speed of about 10 meters per minute from one edge of the sheet to the opposite edge. A layer of adhesive composition having a thickness of about 50 µm, corresponding to a weight per unit area of about 50 g/m², is thus deposited. The PET sheet thus coated is then placed in an oven at 120° C. for 8 minutes for curing of the adhesive composition, and is then laminated onto a protective nonstick layer consisting of a rectangular silicone-treated film sheet of the same dimensions.

Example 2c

Peel Test at 180° C. on Sand-Polished Stainless Steel

The adhesive power is evaluated by the 180° peel test as described in the Finat No. 1 method, published in the Finat Technical Handbook, 6th edition, 2001, on polyolefin. FINAT is the International Federation for Self-Adhesive Label Manufacturers and Converters. The principle of this test is as follows:

Immediately after it has cured, a specimen in the form of a rectangular strip (25 mm×175 mm) is cut out from the PET support layer coated with the composition cured according to example 2b. This specimen, after it has been prepared, is stored either for 24 hours at a temperature of 23° C. and under an atmosphere with a relative humidity of 50% ("D+1"), or for 14 days at a temperature of 50° C. ("D+14"). It is attached over ⅔ of its length (after removal of the corresponding portion of protective nonstick layer) to a substrate consisting of a sheet of stainless steel. The assembly obtained is left at room temperature (23° C.) for 20 minutes. It is then placed in a tensile testing device capable, starting from the end of the rectangular strip which has remained free, of carrying out the peeling or detachment of the strip under an angle of 180° and with a rate of separation of 300 mm per minute. The device measures the force required to detach the strip under these conditions.

Example 2d

Results

TABLE 1

| | results | | | |
|---|---|---|---|---|
| | One-component composition F1 (comparative) | Composition F2 One-component (comparative) | Composition E1 (invention) | Composition E2 (invention) |
| Composition B | — | — | B1 | B2 |
| Total content of catalyst in the final adhesive composition (mass %) | 0.5% | 1% | 1% | 0.1% |
| Ratio A:B | Not applicable | Not applicable | 98:2 | 98:2 |
| Visual appearance | Less than 100 defects*/m² | More than 500 defects*/m² | Less than 20 defects*/m² | Less than 20 defects*/m² |
| Skinning time at 100° C. (in seconds) | 200 | not measured since too many defects | 90 | 37 |
| Peel test (N/inch) on stainless steel D + 1 at 23° C. | 24.5 | not measured since too many defects | 23.6 | 22.7 |
| D + 14 after storage at 50° C. (measurement taken at 23° C.) | 18.0 | not measured since too many defects | 20.6 | 21.1 |

*the defects may be grains, or coarser gels.

The results show that compositions E1 and E2 advantageously lead to a shorter skinning time than that of the comparative composition F1, and also to a good visual appearance. Moreover, the one-component composition F2 comprising 1% of catalyst does not make it possible to obtain an HMPSA of satisfactory appearance. This means that the PSA coating comprises too many appearance defects that are unacceptable for the end user. Moreover, an excessively high concentration of catalyst in the one-component formulation of F1 or F2 type represents a risk as regards the stability of the adhesive in its packaging during storage, with a formation of gels and of premature surface skin. All these defects formed in the packaging are liable to create problems during application, such as uncontrolled release of more or less solid or gelled product, and clogging of pipes or of the application nozzle, leading to lack of material or thickness defects in the final coating.

In addition, the peel tests after storage for one day at 23° C., or 14 days at 50° C., show that compositions E1 and E2 allow the adhesive article to achieve good final performance qualities.

Thus, compositions E1 and E2 advantageously lead to shorter curing times, and thus make it possible to prepare self-adhesive articles with a higher industrial production rate.

The invention claimed is:

1. A multicomponent adhesive composition comprising:
    a composition A comprising:
        at least one silyl polymer comprising at least one hydrolyzable alkoxysilane group; and
        at least one tackifying resin; and
    a composition B comprising:
        at least one catalyst; and
        at least one compound C chosen from:
            a compound C1 with a number-average molecular mass ranging from 300 g/mol to 500,000 g/mol; and
            a compound C2 with a vapor pressure at 20° C. of greater than or equal to 0.08 kPa; and
            mixtures thereof;
    wherein a mass ratio of composition A:composition B ranges from 99.98:0.02 to 60:40; and
    wherein a total content of catalyst ranges from 0.01% to 10% by weight relative to the total weight of said adhesive composition.

2. The composition as claimed in claim 1, wherein the silyl polymer including at least one hydrolyzable alkoxysilane group, of composition A, is chosen from polymers of formulae (II), (III), (IV) or (V) as defined below, and mixtures thereof:

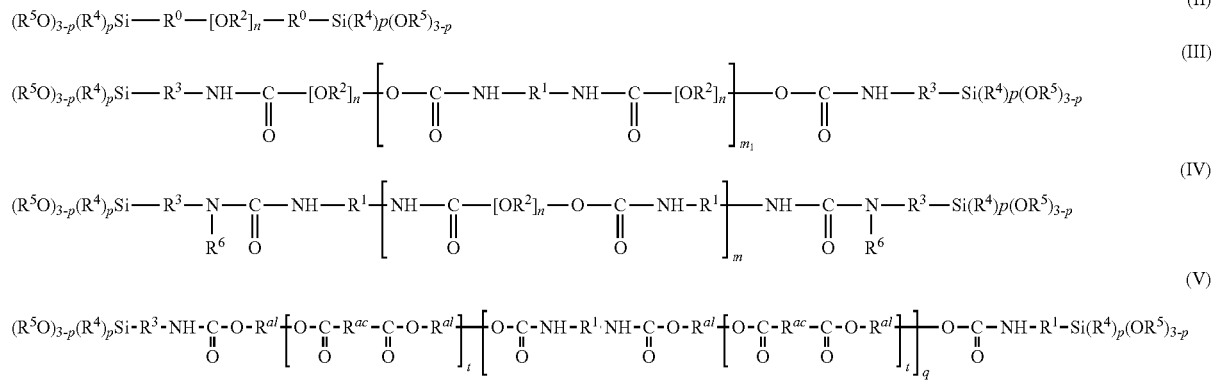

wherein:
    $R^1$ represents a divalent hydrocarbon-based radical comprising from 5 to 15 carbon atoms, which may be aromatic or aliphatic, linear, branched or cyclic,
    $R^0$ represents a linear or branched divalent alkylene radical comprising from 3 to 6 carbon atoms,
    $R^3$ represents a linear or branched divalent alkylene radical comprising from 1 to 6 carbon atoms,
    $R^2$ represents a linear or branched divalent alkylene radical comprising from 2 to 4 carbon atoms,
    $R^4$ and $R^5$, which may be identical or different, each represent a linear or branched alkyl radical comprising from 1 to 4 carbon atoms,
    $R^6$ represents a hydrogen atom, a phenyl radical, a linear, branched or cyclic alkyl radical comprising from 1 to 6 carbon atoms, or a 2-succinate radical of formula:

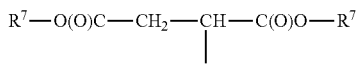

wherein $R^7$ is a linear or branched alkyl radical comprising from 1 to 6 carbon atoms,
    n is an integer such that the number-average molecular mass of the polyether block of formula $—[OR^2]_n—$ ranges from 300 g/mol to 40,000 g/mol in the polymers of formulae (II), (III) and (IV),
    $m_1$ is zero or an integer,
    n and $m_1$ are such that the number-average molecular mass of the polymer of formula (III) ranges from 500 g/mol to 50,000 g/mol,
    m is an integer other than zero,
    n and m are such that the number-average molecular mass of the polymer of formula (IV) ranges from 500 g/mol to 50,000 g/mol,
    p is an integer equal to 0, 1 or 2,
    $R^{al}$ represents a divalent hydrocarbon-based radical derived from a diol by replacement of each of the two hydroxyl groups with a free valency;
    $R^{ac}$ represents a divalent hydrocarbon-based radical derived from a dicarboxylic acid by replacement of each of the two carboxyl groups —COOH with a free valency;
    t is a number such that the polyester diol of formula (VI):

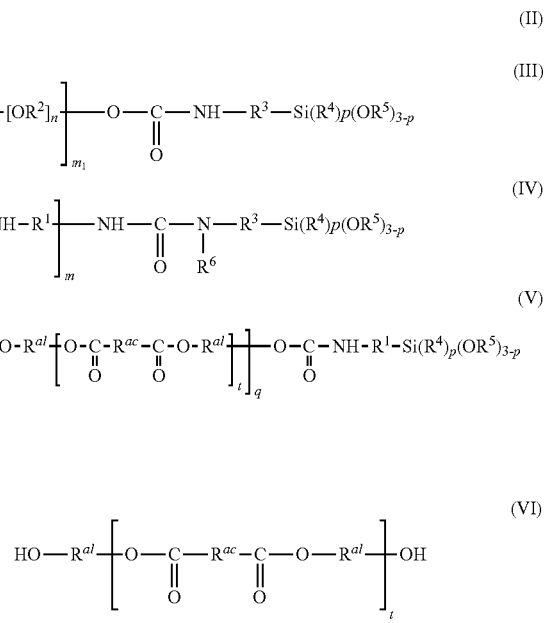

has a hydroxyl number $I_{OH}$ of between 4 and 60 mg KOH/g;
    q is an integer other than zero, and
    t and q are such that the number-average molecular mass of the polymer of formula (V) is between 400 g/mol and 50,000 g/mol.

3. The composition as claimed in claim 2, wherein the silyl polymer, of composition A, is chosen from:
    a polymer of formula (III) wherein:
        $m_1$ is an integer equal to 0,
        p=1,
        $R^4$ and $R^5$ each represent a methyl radical,
        $R^3$ represents a divalent methylene radical,
        wherein a number-average molar mass of said polymer ranges from 5000 to 30,000 g/mol;

a polymer of formula (III) wherein:
  $m_1$ is an integer other than 0,
  p=0,
  $R^3$ represents a divalent propylene radical,
  $R^5$ represents a methyl radical,
  the number-average molecular mass of said polymer ranges from 5000 to 30,000 g/mol; and
a polymer of formula (V) wherein:
  q is an integer other than 0,
  p=0,
  $R^3$ represents a divalent propylene radical,
  $R^5$ represents a methyl radical,
  the number-average molecular mass of said polymer ranges from 5000 to 30,000 g/mol.

4. The composition as claimed in claim 1, wherein composition A also comprises at least one additive, selected from the group consisting of plasticizers, solvents, pigments, dyes, adhesion promoters, moisture absorbers, UV stabilizers, antioxidants, glitter flakes, fluorescent materials, rheological additives, fillers, flame retardants, waxes, and mixtures thereof.

5. The composition as claimed in claim 1, wherein the catalyst is selected from the group consisting of amines, organometallic compounds, acids and derivatives thereof, and mixtures thereof.

6. The composition as claimed in claim 5, wherein the amines are selected from the group consisting of triethylamine, tributylamine, tetramethylguanidine, 1,8-diazabicyclo[5.4.0]-7-undecene, 1,4-diazabicyclo[2.2.2]octane, 1,5-diazabicyclo[4.3.0]non-5-ene, N,N-bis(N,N-dimethyl-2-aminoethyl)methylamine, N,N-dimethylcyclohexylamine, N,N-dimethylphenylamine, N-ethylmorpholine, and mixtures thereof.

7. The composition as claimed in claim 5, wherein the acids are chosen from:
  organic acid catalysts selected from sulfonic acids, carboxylic acids, organophosphate acids, organophosphonate acids, phosphonic acids, and mixtures thereof,
  inorganic acid catalysts selected from phosphoric acid, orthophosphoric acid, phosphorous acid, hypophosphorous acid, and sulfuric acid, and
  mixtures thereof.

8. The composition as claimed in claim 7, wherein the organophosphate acids are chosen from the group consisting of C1-C22 mono- or dialkyl phosphate acids and mixtures thereof; mono- or diaryl phosphates, and mixtures thereof; alkyl phenyl phosphates; and mixtures thereof.

9. The composition as claimed in claim 7, wherein the sulfonic acids are chosen from N-alkylaminoalkylsulfonic acids and N,N-dialkylaminoalkylsulfonic acids, and mixtures thereof.

10. The composition as claimed in claim 5, wherein the acid derivatives comprise acid anhydrides, acid esters, or acid ammonium salts.

11. The composition as claimed in claim 1, wherein compound C1 is selected from the group consisting of polyols, polyetheramines, tackifying resins, organosilanes, monosilyl or polysilyl polymers, polyol esters, and mixtures thereof.

12. The composition as claimed in claim 1, wherein compound C2 is selected from the group consisting of alcohols.

13. The composition as claimed in claim 1, wherein the catalyst(s):compound(s) C ratio in composition B ranges from 0.01:99.99 to 95:5.

14. The composition as claimed in claim 1, wherein composition B comprises water in a content ranging from 0.05% to 50% by mass relative to the total mass of composition B.

15. The composition as claimed in claim 1, wherein the total content of catalyst ranges from 0.01% to 10% by weight relative to the total weight of said composition.

16. The composition as claimed in claim 1, wherein the composition A:composition B mass ratio ranges from 99.95:0.05 to 90:10.

17. A self-adhesive article comprising a support layer coated with a self-adhesive layer, said self-adhesive layer comprising a composition as claimed in claim 1, in cured form.

18. A process for the hot application of the multicomponent adhesive composition of claim 1, to a support, by means of an installation for the hot application of said adhesive composition, the installation comprising:
  a nozzle for applying the multicomponent adhesive composition;
  a first line for feeding composition A of the multicomponent adhesive composition to be applied in fluid form;
  a second line for feeding composition B of the multicomponent adhesive composition to be applied in fluid form;
  a third line for feeding the nozzle with the multicomponent adhesive composition to be applied in fluid form; and
  a mixer for mixing at least compositions A and B of the multicomponent adhesive composition;
the process comprising:
  supplying the first feed line with at least composition A of the multicomponent adhesive composition;
  supplying the second feed line with at least composition B of the multicomponent adhesive composition;
  mixing at least composition A and composition B of the multicomponent composition using the mixer;
  hot application of the mixed multicomponent adhesive composition onto a support with the aid of the application nozzle.

19. The process as claimed in claim 18, wherein the mixer is a static mixer or a dynamic mixer.

20. The process as claimed in claim 18, wherein the installation comprises more than one mixer.

* * * * *